United States Patent
Staten et al.

(10) Patent No.: US 8,390,620 B1
(45) Date of Patent: Mar. 5, 2013

(54) TECHNIQUE FOR CONVERTING NON-CONFORMING HEXAHEDRAL-TO-HEXAHEDRAL INTERFACES INTO CONFORMING INTERFACES

(75) Inventors: Matthew L. Staten, Albuquerque, NM (US); Jason F. Shepherd, Edgewood, NM (US); Frank Ledoux, Lisses (FR); Kenji Shimada, Pittsburgh, PA (US); Karl G. Merkley, Lindon, UT (US); Carlos Carbonera, St. Paul, MN (US)

(73) Assignee: Sandia Corporation, Albuquerque, NM (US)

( * ) Notice: Subject to any disclaimer, the term of this patent is extended or adjusted under 35 U.S.C. 154(b) by 1036 days.

(21) Appl. No.: 12/397,566

(22) Filed: Mar. 4, 2009

Related U.S. Application Data

(60) Provisional application No. 61/033,683, filed on Mar. 4, 2008.

(51) Int. Cl.
*G06T 15/30* (2011.01)
*G06T 17/00* (2006.01)
*G06F 17/50* (2006.01)
*G06G 7/48* (2006.01)

(52) U.S. Cl. .................. 345/423; 345/424; 703/1; 703/7

(58) Field of Classification Search .................. None
See application file for complete search history.

(56) References Cited

U.S. PATENT DOCUMENTS

| | | | |
|---|---|---|---|
| 6,560,570 B1 * | 5/2003 | Dohrmann et al. ............... | 703/7 |
| 7,098,912 B1 | 8/2006 | Borden et al. | |
| 7,181,377 B1 | 2/2007 | Borden et al. | |
| 7,219,039 B1 | 5/2007 | Shepherd et al. | |

OTHER PUBLICATIONS

Michael J. Borden, "Modification of All-Hexahedral Finite Element Meshes by Dual Sheet Insertion and Extraction", M. S. Thesis, Aug. 2002.*
Michael J. Borden, Steven E. Benzley, Jason Shepherd and Mark Nugent, "Refinement of All-hexahedral Meshes by Sheet Insertion", document referred in the U.S. Appl. No. 60/390,957, filed Jun. 24, 2002.*
U.S. Appl. No. 11/873,864, filed Oct. 19, 2007, Staten et al.
U.S. Appl. No. 11/874,008, filed Oct. 17, 2007, Staten et al.
U.S. Appl. No. 11/874,064, filed Oct. 17, 2007, Staten et al.
Shepherd, Jason F., "Topologic and Geometric Constraint-Based Hexahedral Mesh Generation", May 2007, School of Computing, University of Utah, 195 pages.
Staten, Matthew L. et al., "Mesh Matching—Creating Conforming Interfaces Between Hexahedral Meshes", Presentation, 17th International Meshing Roundtable, Oct. 12, 2008, 59 pages.
Pebay, Philippe P. et al., "pCAMAL: An Embarrassingly Parallel Hexahedral Mesh Generator", Proceedings 16th International Meshing Roundtable, Oct. 2007, pp. 269-284.

(Continued)

*Primary Examiner* — Kee M Tung
*Assistant Examiner* — Sing-Wai Wu
(74) *Attorney, Agent, or Firm* — Cory G. Claassen

(57) ABSTRACT

A technique for conforming an interface between a first mesh and a second mesh is disclosed. A first interface surface in the first mesh and a second interface surface in the second mesh residing along the interface are identified. The first and second interface surfaces are initially non-conforming along the interface. Chords within the first and second interface surfaces that fall within a threshold separation distance of each other are paired. Sheets having chords that reside within the first or second interface surfaces are recursively inserted into or extracted from one or both of the first and second meshes until all remaining chords within the first interface surface are paired with corresponding chords in the second interface surface and all remaining chords within the second interface surface are paired with corresponding chords in the first interface surface.

25 Claims, 28 Drawing Sheets

OTHER PUBLICATIONS

Tautges, Timothy J. et al., "The Generation of Hexahedral Meshes for Assembly Geometry: Survey and Progress", International Journal for Numerical Methods in Engineering, Apr. 2001, vol. 50, No. 12, pp. 2617-2642, John Wiley & Sons, Ltd., New York.

Dohrmann, C.R. et al., "A Transition Element for Uniform Strain Hexahedral and Tetrahedral Finite Elements", International Journal for Numerical Methods in Engineering, Mar. 12, 1999, p. 1933-1950, vol. 44, No. 12, John Wiley & Sons, Ltd., New York.

Dohrmann, C.R. et al., "A Method for Connecting Dissimilar Finite Element Meshes in Two Dimensions", International Journal for Numerical Methods in Engineering, Jan. 11, 2000, p. 655-678, vol. 48, No. 5 John Wiley & Sons, Ltd., New York.

Dohrmann, C.R. et al., "Methods for Connecting Dissimilar Three-Dimensional Finite Element Meshes", International Journal for Numerical Methods in Engineering, Jan. 11, 2000, p. 1057-1080, vol. 47, No. 5, John Wiley & Sons, Ltd., New York.

Puso, Michael A. et al., "A Segment-to-Segment Mortar Contact Method for Quadratic Elements and Large Deformations", Computer Methods in Applied Mechanics and Engineering, Jan. 2008, p. 555-566, vol. 197., Nos. 6-8.

Trujillo, David M. et al., "A General Thermal Contact Resistance Finite Element", Finite Elements in Analysis and Design, Jan. 2002, p. 263-276, vol. 38, No. 3.

Staten, Matthew L. et al., "Mesh Matching—Creating Conformal Interfaces Between Hexahedral Meshes", Proceedings 17th International Meshing Roundtable, Oct. 12, 2008, p. 467-484.

Murdoch, Peter et al., "The Spatial Twist Continuum: A Connectivity Based Method for Representing All-Hexahedral Finite Element Meshes", Finite Elements in Analysis and Design, Dec. 15, 1997, p. 137-149, vol. 28, No. 2.

Tautges, Timothy J. et al., "Topology Modification of Hexahedral Meshes Using Atomic Dual-Based Operations", Proceedings 12th International Meshing Roundtable, Sep. 2003, p. 415-423.

Borden, Michael J. et al., "Hexahedral Sheet Extraction", Proceedings 11th International Meshing Roundtable, Sep. 2002, p. 147-152.

Mitchell, Scott A. et al., "Pillowing Doublets: Refining a Mesh to Ensure That Faces Share At Most One Edge", Proceedings 4th International Meshing Roundtable, Oct. 1995, p. 231-240.

Merkley, Karl et al., "Methods and Applications of Generalized Sheet Insertion for Hexahedral Meshing", Proceedings 16th International Meshing Roundtable, Oct. 2007, p. 233-250.

Borden, Michael J. et al., "The Cleave and Fill Tool: An All-Hexahedral Refinement Algorithm for Swept Meshes", Proceedings 9th International Meshing Roundtable, Oct. 2000, p. 69-76.

Harris, Nathan J. et al. "Conformal Refinement of All-Hexahedral Element Meshes Based on Multiple Twist Plane Insertion", Proceedings 13th International Meshing Roundtable, Sep. 2004, p. 157-167.

Jankovich, Steven R. et al., "The Graft Tool: An All-Hexahedral Transition Algorithm for Creating a Multi-Directional Swept Volume Mesh", Proceedings 8th International Meshing Roundtable, Sep. 1999, p. 387-392.

Tchon, Ko-Foa et al., "Conformal Refinement of All-Quadrilateral and All-Hexahedral Meshes According to an Anisotropic Metric", Proceedings 11th International Meshing Roundtable, Sep. 2002, p. 231-242.

Staten, Matthew L. et al., "A Methodology for Quadrilateral Finite Element Mesh Coarsening" Engineering With Computers, Jun. 2008, p. 241-251, vol. 24, No. 3.

Borden, Michael J. et al., "Mesh Cutting: Fitting Simple All-hexahedral Meshes to Complex Geometric Features", Proceedings 8th International Society of Grid Generation, Jun. 2002, p. 727-736.

Melander, Darryl J. et al., "Generation of Multi-Million Element Meshes for Solid Model-Based Geometries: The Dicer Algorithm", AMD—Trends in Unstructured Mesh Generation, Jul. 1997, p. 131-135, vol. 220.

Knupp, Patrick et al., "Integration of Mesh Optimization with 3D All-Hex Mesh Generation", SAND99-2852, Sandia National Laboratories, printed Nov. 1999, 16 pages.

Shepherd, Jason F. et al., "Hexahedral Mesh Generation Constraints", Engineering With Computers, Jun. 2008; p. 195-213, vol. 24, No. 3.

Woodbury, Adam C. et al., "Localized Coarsening of Conforming All-Hexahedral Meshes", Proceedings 17th International Meshing Roundtable, Oct. 15, 2008, p. 603-619.

Hauret, Patrice et al., "A Discontinuous Stabilized Mortar Method for General 3D Elastic Problems", Computer Methods in Applied Mechanics and Engineering, Nov. 2007, p. 4881-4900, vol. 196., Nos. 37-40.

\* cited by examiner

EDGE GROUP

DUAL REPRESENTATION

PRIMAL REPRESENTATION

SELF-INTERSECTING

SELF-TOUCHING

SELF-INTERSECTING & SELF TOUCHING

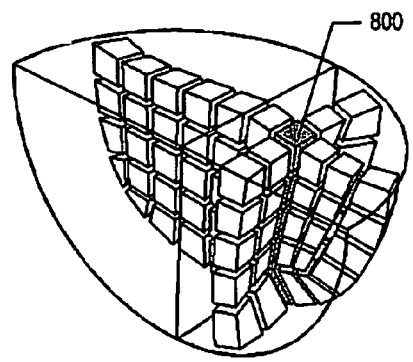
FIG. 8
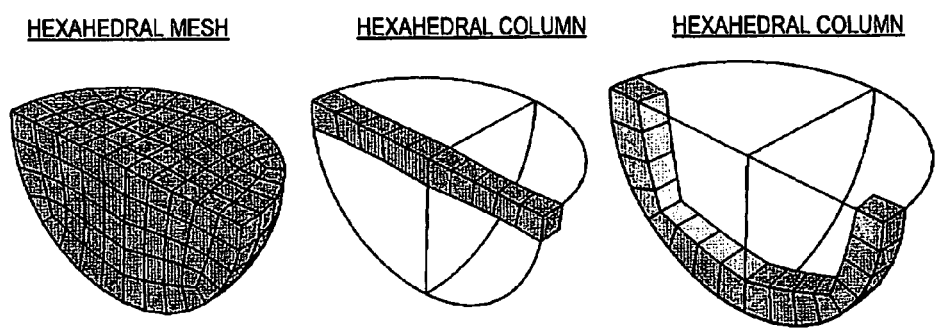
FIG. 9
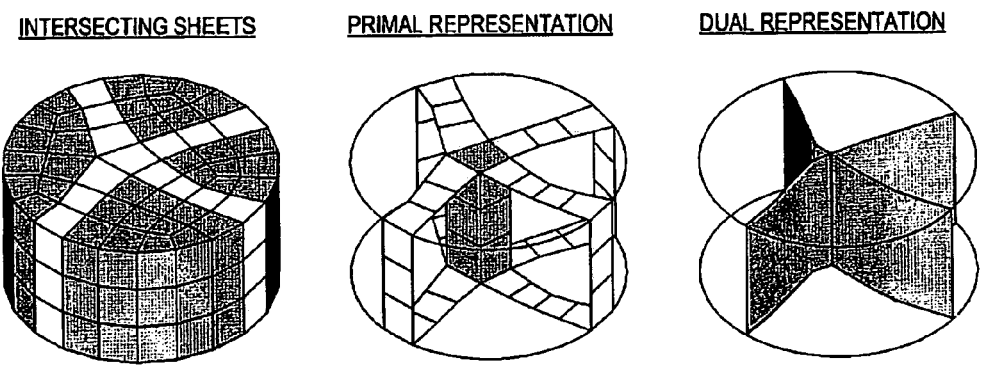
FIG. 10A  FIG. 10B  FIG. 10C

1405
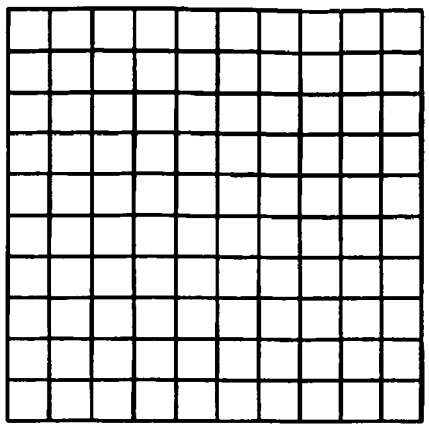
CONFORMING MESH
(NO HANGING NODES)
1410
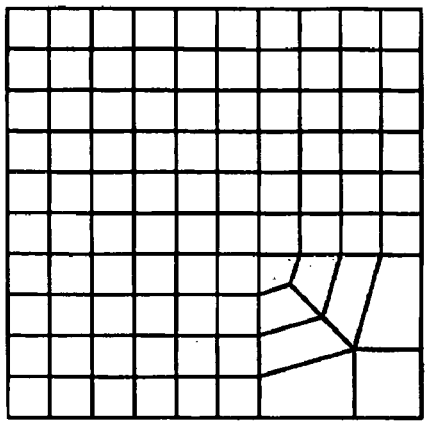
CONFORMING MESH
(NO HANGING NODES)
1415
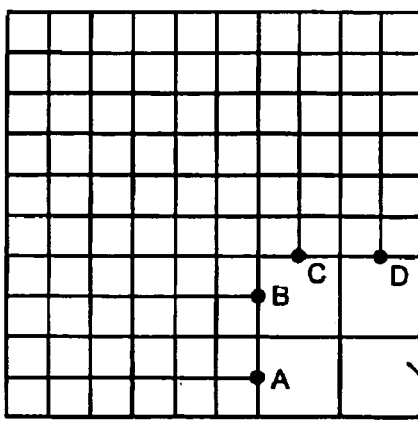
NON-CONFORMING MESH
(NODES A, B, C, & D ARE
HANGING NODES)
1420
FIG. 14

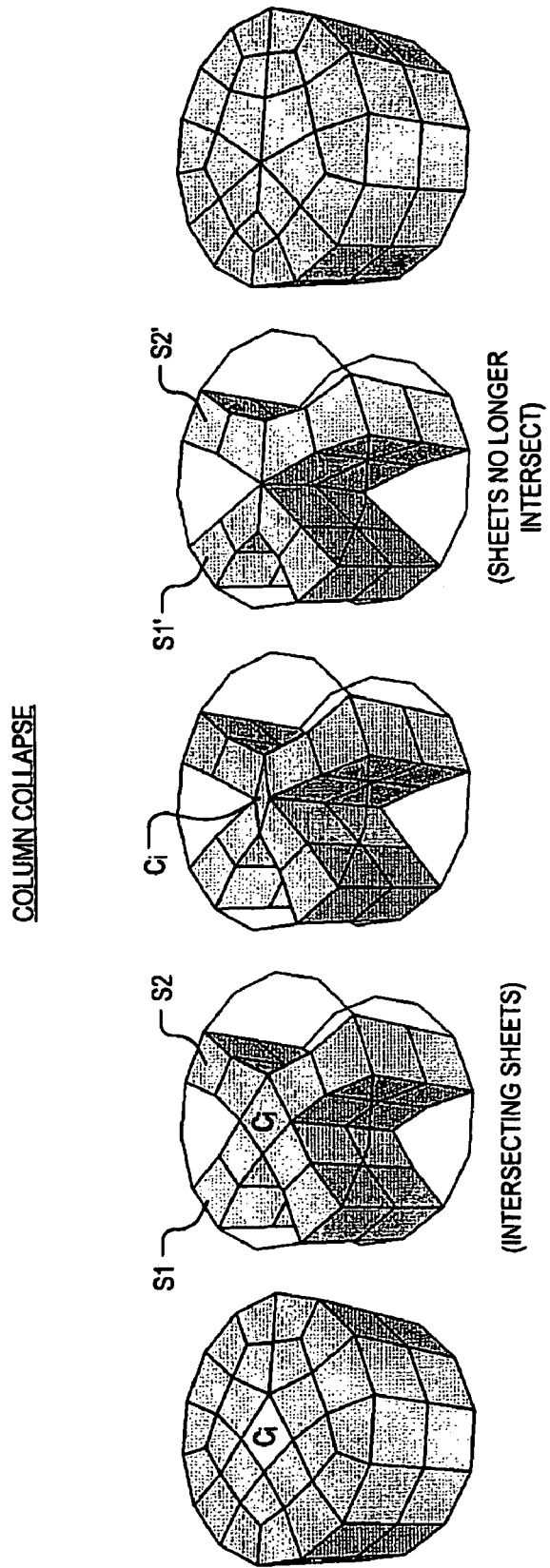
FIG. 15A  FIG. 15B (INTERSECTING SHEETS)  FIG. 15C COLUMN COLLAPSE  FIG. 15D (SHEETS NO LONGER INTERSECT)  FIG. 15E

SHEET INSERTION: "PILLOWING"

SHEET INSERTION: "DICING"

SHEET INFLATION WITH 3NMEsets (SELF-TOUCHING OPTION)

(SELF-INTERSECTING OPTION)

SHEET INFLATION WITH 4NMEset (SELF-TOUCHING OPTION)

(SELF-INTERSECTING OPTION)

SHEET INFLATION WITH 4NMEset: NODE DUPLICTION

SHEET INFLATION WITH TWO 3NMEsets: NODE DUPLICTION

PSEUDO CODE FOR MESH MATCHING

1. FOR EACH $c_i \in C_A$
2.     Search for a $c_j \in C_B$ such that $c_j = c_i$ within a tolerance, $\delta$
3.     IF $c_j \neq \emptyset$ THEN
4.         create chord pair $P_C(c_i, c_j)$
5.     ELSE
6.         Insert $c_i$ into $\Omega_A$
7. FOR EACH $c_k \in C_B$
8.     IF $c_k$ is not in any chord pair THEN
9.         Insert $c_k$ into $\Omega_B$
10. WHILE ($\Omega_A \neq \{\emptyset\}$ OR $\Omega_B \neq \{\emptyset\}$)
11.     IF $M_A$ is modifiable
12.         Find a $c_i \in \Omega_A$ for extraction
13.         IF $c_i \neq \emptyset$ THEN
14.             Remove $c_i$ from $\Omega_A$
15.             Extract sheet $s_i$, adjacent to $c_i$, from $M_A$
16.             Find a $c_j \in \Omega_B$ for which a pair can be inserted into $D_A$
17.             IF $c_j \neq \emptyset$ THEN
18.                 Remove $c_j$ from $\Omega_B$
19.                 Insert sheet $s_j$ into $M_A$ with new chord $c_k$ in $D_A$
20.                 Create $P_C(c_j, c_k)$
21.     IF $M_B$ is modifiable
22.         Find a $c_i \in \Omega_B$ for extraction
23.         IF $c_i \neq \emptyset$ THEN
24.             Remove $c_i$ from $\Omega_B$
25.             Extract sheet $s_i$, adjacent to $c_i$, from $M_B$
26.             Find a $c_j \in \Omega_A$ for which a pair can be inserted into $D_B$
27.             IF $c_j \neq \emptyset$ THEN
28.                 Remove $c_j$ from $\Omega_A$
29.                 Insert sheet $s_j$ into $M_B$ with new chord $c_k$ in $D_B$
30.                 Create $P_C(c_j, c_k)$
31. FOR EACH Chord pair $P_C(c_i, c_j)$
32.     Find sheet $s_i$ and $s_j$, adjacent to chords $c_i$ and $c_j$
33.     Fuse $s_i$ and $s_j$ into single sheet by merging interface nodes
34. Smooth all nodes local to interface surfaces

FIG. 28

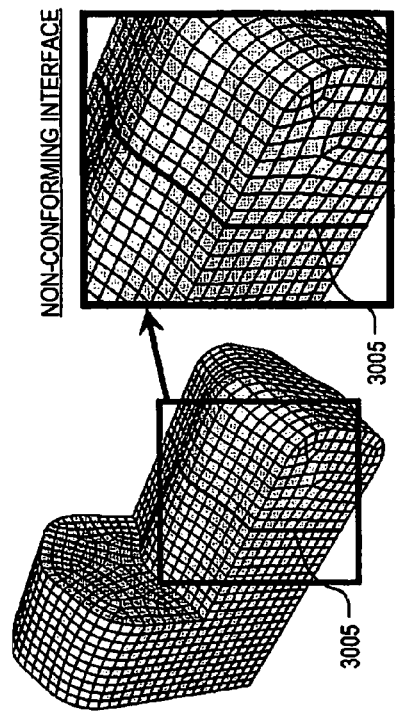
FIG. 30A
FIG. 30B
FIG. 30C
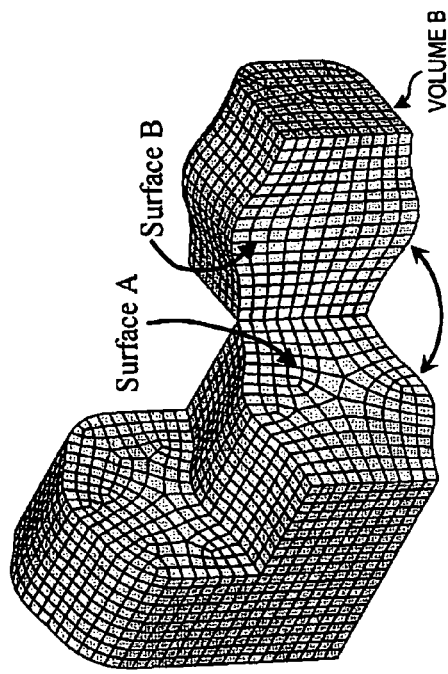
FIG. 31

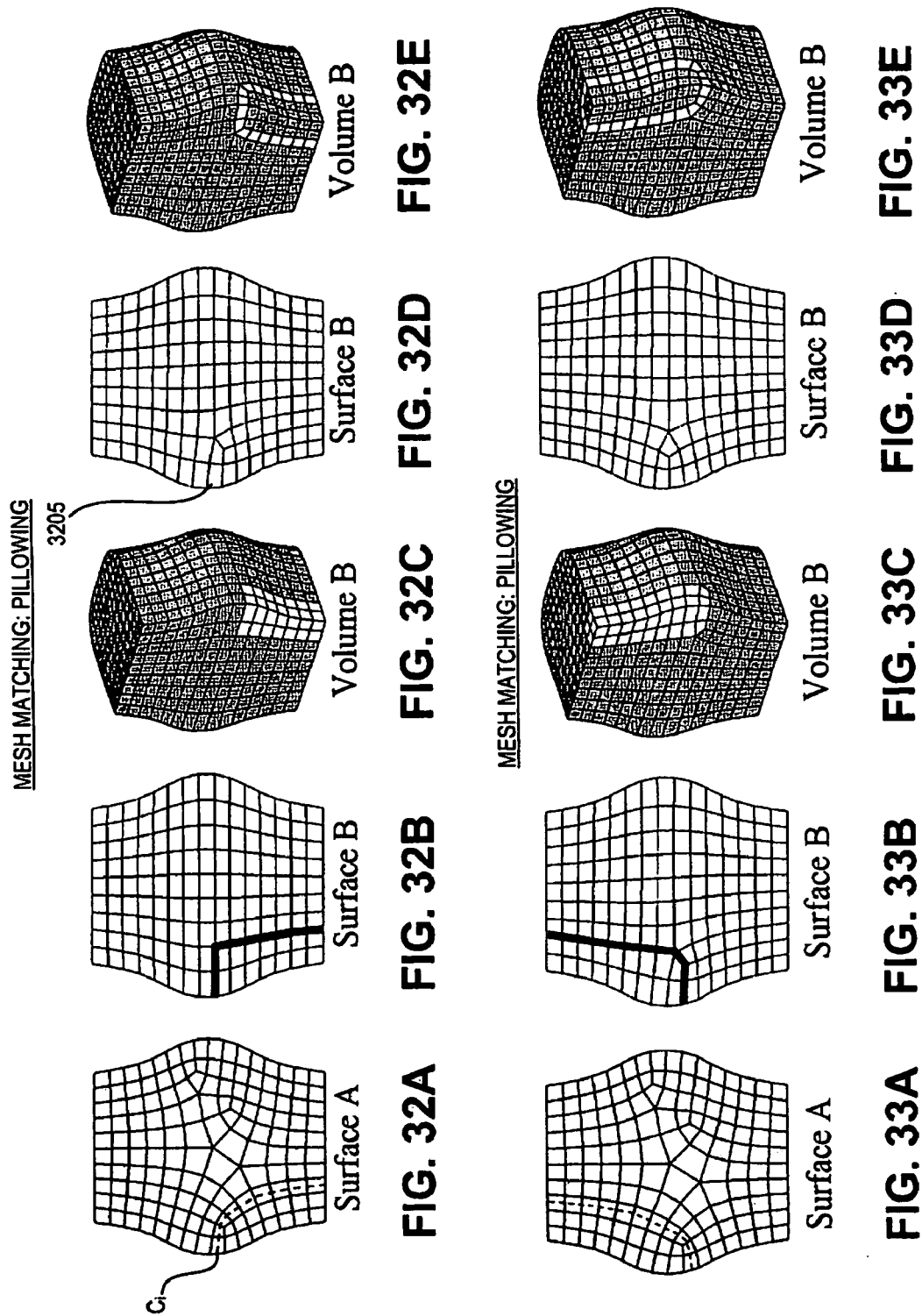

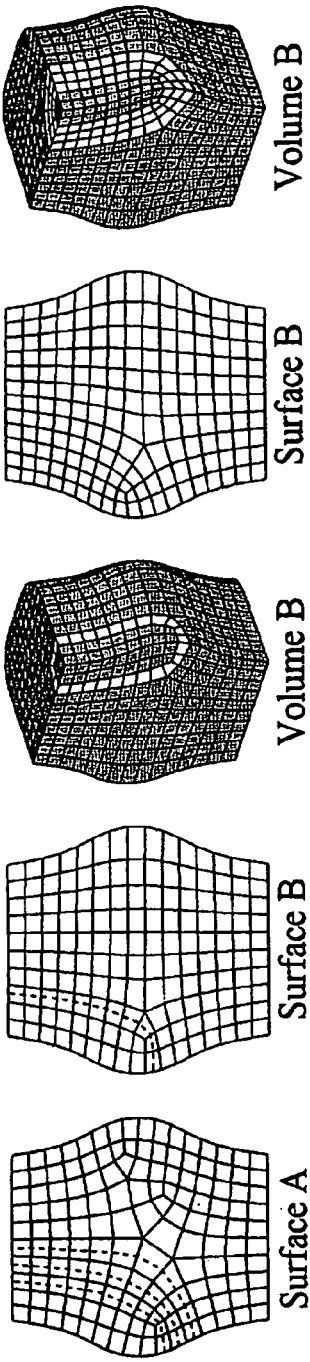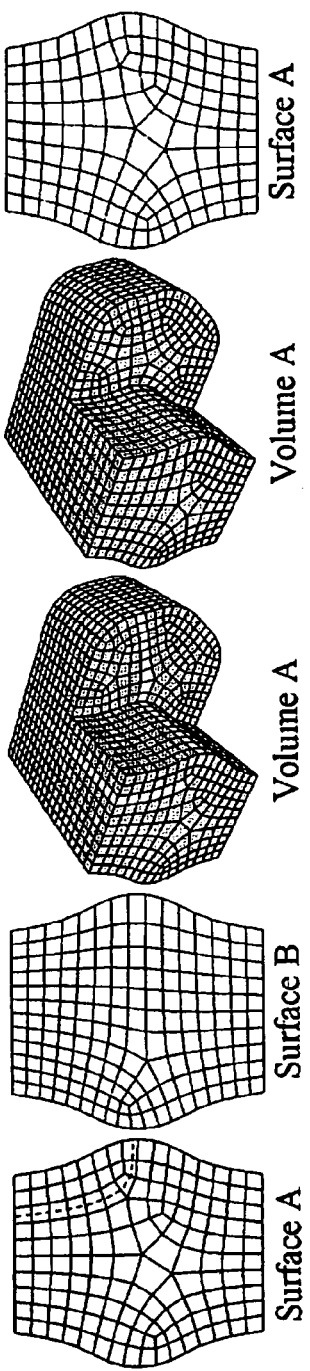

MESH MATCHING: COLUMN COLLAPSE TO LOCALIZE SHEET EXTRACTION

TECHNIQUE FOR CONVERTING NON-CONFORMING HEXAHEDRAL-TO-HEXAHEDRAL INTERFACES INTO CONFORMING INTERFACES

CROSS REFERENCE TO RELATED APPLICATION

This application claims the benefit of U.S. Provisional Application No. 61/033,683 filed on Mar. 4, 2008, the contents of which are incorporated herein by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to computational methods using meshes, and in particular but not exclusively, relates to hexahedral mesh manipulation.

BACKGROUND INFORMATION

One computational method which uses hexahedral meshes is Finite Element Analysis (FEA). FEA is the process of creating a finite element mesh ("FEM"), which represents a physical domain upon which some physical phenomenon is to be analyzed. These domains can be broken up into either two dimensional ("2D") or three dimensional ("3D") domains. 3D domains represent the full-3D dimensions of an actual 3D domain. 3D domains are most often modeled with either tetrahedral or hexahedral elements. Less often, 3D domains are modeled with pyramid or wedge elements. FIG. 1 illustrates these four basic element types.

2D domains represent a physical phenomenon which is geometrically located in some kind of surface (either planar or non-planar), such as surface wave front propagation in liquids, or a thin sheet metal object such as the hood of a car. In addition, 2D domains are used to represent a simplification of a 3D domain, such as a cross-section of a 3D domain. 2D domains are most often modeled with either quadrilateral or triangular elements. FIG. 2 illustrates these 2D element types.

FEMs are typically composed of a single element type. For example, a hexahedral mesh is composed of only hexahedral elements. A "hybrid" mesh is a mesh composed of more than a single element type. For most FEA solvers, a non-hybrid mesh is preferred. Many FEA solvers do not support hybrid meshes.

FEA and all of its variations are an important part of current design through analysis processes. Thanks to its flexibility, FEA successfully reproduces a large spectrum of physical phenomena. FEA is performed by first decomposing a volumetric model geometry into a set of face-connected elements, usually tetrahedral or hexahedral finite elements. Each element is defined by connecting a set of nodes, which define discrete position vectors throughout the model domain. The collection of finite elements forms a finite element mesh, which provides a discrete approximation to the object being analyzed. This allows the solution of the governing equations to be approximated with simple shape functions, typically linear or quadratic functions, over each individual element. A system of linear equations follows with the unknowns being approximations to the solution at the discrete nodal positions. These nodal values, combined with the element shape functions, provide an approximation of the solution on the system as a whole.

Hexahedral mesh generation is an important bottleneck preventing broader use of FEA, often consuming as much as 70-80% of the overall design through analysis process. Hexahedral mesh generation is particularly difficult when the model being meshed is composed of multiple different volumes which must behave as a single solid. Multi-volume models arise in two different scenarios. First, the model represents a multi-part mechanism, which has some parts bonded together to act as a single object. Second, the model is a single physical component, which has been decomposed geometrically in order to simplify the meshing process. For example, FIG. 3A illustrates a model with a single component. In FIG. 3B, the part is decomposed allowing each partition to be meshed with hexahedral elements as illustrated in FIG. 3C and then joined as illustrated in FIG. 3D.

Regardless of the origins of the multi-part model, modeling of the interfaces between adjacent components is particularly important. Two or more spatially adjacent components often must behave as a single component since their interfaces are welded or glued together. A conforming mesh across such interfaces ensures inter-element continuity in the finite element shape functions resulting in a smooth and accurate interpolation of the numerical solution. However, requiring a conforming mesh severely restricts hexahedral mesh generators. Satisfying the resulting constraints requires a time consuming global linear programming problem of interval assignment, and requires all surfaces to be meshed in a single serial process. In addition, strict hexahedral topology requirements paired with conforming interface constraints, often leads to an over-constrained system and meshing failure. Other known hexahedral finite element methods are completely unable to generate conforming interfaces on multi-volume models.

Optionally, interfaces can be left non-conforming by using artificial constraints such as multi-point constraints, tied contacts, gap elements, or mortar formulations. Although these artificial constraint techniques have matured significantly in recent years, non-conforming meshes break shape function inter-element continuity, resulting in solution quality degradation, discontinuous solution fields and/or adverse effects on solution convergence. In addition, these artificial constraints introduce additional equations to the system increasing the amount of time required to solve the system. Thus, non-conforming interface conditions should be avoided in critical regions of the model. Conforming interfaces are typically preferred, whenever possible.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 8 illustrates how the intersection of two sheets within a hexahedral mesh defines a hexahedral column, in accordance with an embodiment of the invention.

FIG. 9 illustrates two columns within a hexahedral mesh, in accordance with an embodiment of the invention.

FIGS. 10A-C illustrate the primal and dual representation of two intersecting sheets within a hexahedral mesh, in accordance with an embodiment of the invention.

FIG. 14 illustrates conforming and non-conforming two-dimensional meshes, in accordance with an embodiment of the invention.

FIGS. 15A-E illustrate a column collapse operation, in accordance with an embodiment of the invention.

FIG. 28 including pseudo code for mesh matching, in accordance with an embodiment of the invention.

FIGS. 30A-C illustrate a non-conforming interface between two volumes of a hexahedral mesh, in accordance with an embodiment of the invention.

FIG. 31 illustrates the quadrilateral meshes on the interface surfaces between two hexahedral meshes, in accordance with an embodiment of the invention.

FIGS. 32A-E illustrate a mesh matching example using pillowing to insert a sheet into a mesh, in accordance with an embodiment of the invention.

FIGS. 33A-E illustrate a mesh matching example using pillowing to insert a second sheet into a mesh, in accordance with an embodiment of the invention.

FIGS. 34A-E illustrate a mesh matching example using dicing to insert two sheets into a mesh, in accordance with an embodiment of the invention.

FIGS. 35A-E illustrate a mesh matching example using sheet extraction to remove a sheet from a mesh, in accordance with an embodiment of the invention.

DETAILED DESCRIPTION

Embodiments of a technique for "mesh matching" to convert non-conforming hexahedral-to-hexahedral interfaces to conforming interfaces are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DEFINITIONS

Throughout this specification, several terms of art are used. These terms are to take on their ordinary meaning in the art from which they come, unless specifically defined herein or the context of their use would clearly suggest otherwise.

Hexahedral Mesh: A hexahedral mesh is a three-dimensional ("3D") mesh formed of a plurality of hexahedral elements linked together.

Primal Representation: The elemental representation of a finite element mesh, comprised of hexahedra, quadrilaterals, edges, and nodes, is known as the primal representation. The primal representation of a hexahedral mesh is a 4-tuple (H,F,E,N) where H is a non-empty set of hexahedral elements, F is the non-empty set of all quadrilateral faces incident to one or more hexahedra in H, E is the non-empty set of all edges incident to one or more hexahedra in H, and N is the non-empty set of all nodes incident to one or more hexahedra in H.

Dual Representation: Hexahedral meshes also have an alternate representation known as the dual representation, comprised of sheets, chords, and vertices. The dual representation is a 3-tuple D=(S,C,V), where S is a non-empty set of surfaces, called sheets, C is a non-empty set of curves, called chords, and V is a non-empty set of dual vertices.

Figure 1:
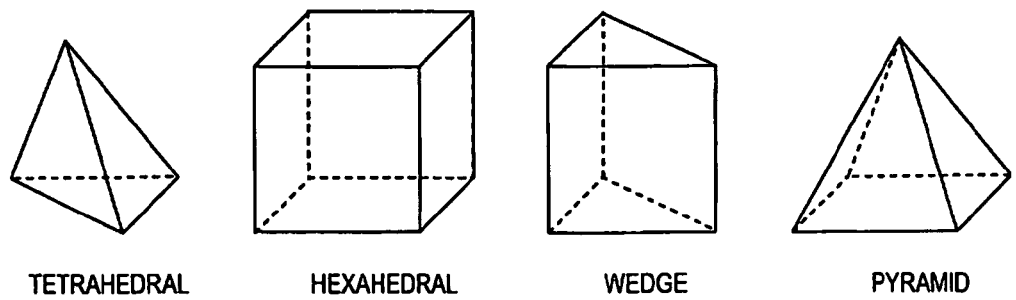
FIG. 1 (prior art) illustrates some of the basic mesh elements of three-dimensional finite element meshes ("FEMs").
Figure 2:
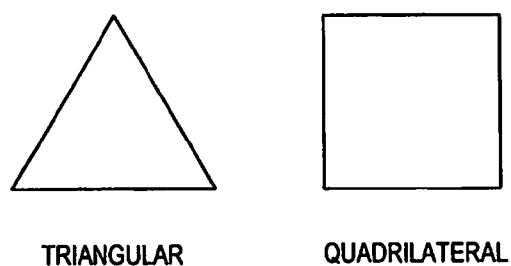
FIG. 2 (prior art) illustrates some of the basic mesh elements of two-dimensional FEMs.
Figure 3A:
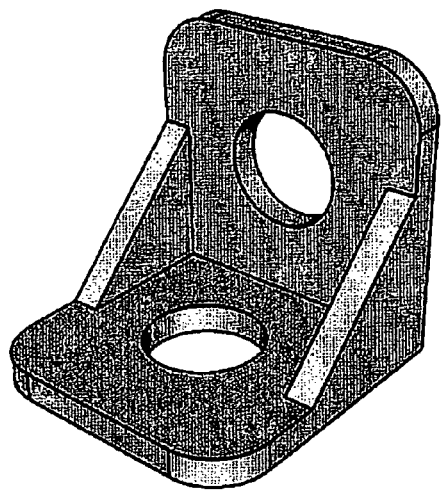
FIGS. 3A-3D (prior art) illustrate modeling using finite element analysis ("FEA") via component decomposition.
Figure 3B:
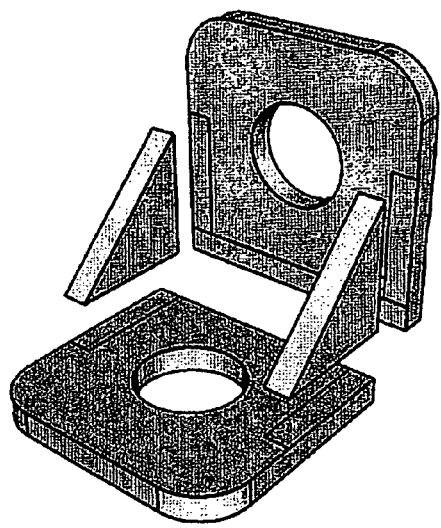
Figure 3C:
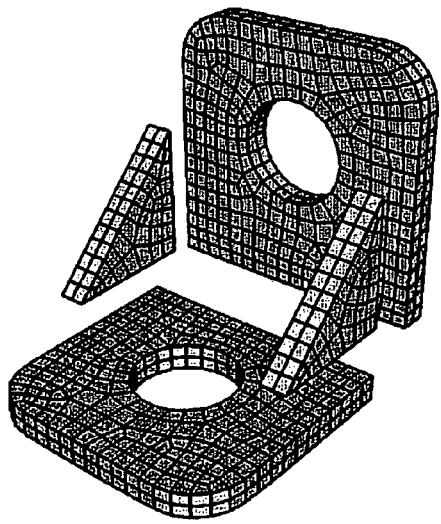
Figure 3D:
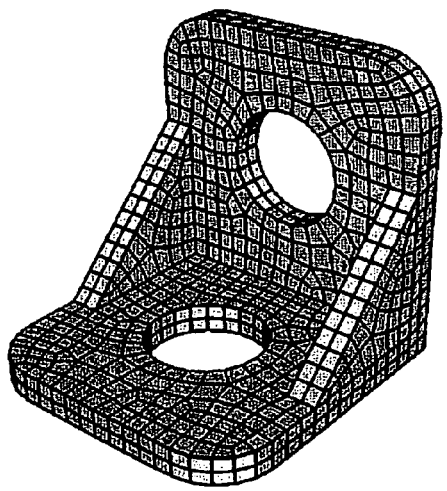
Figure 4:
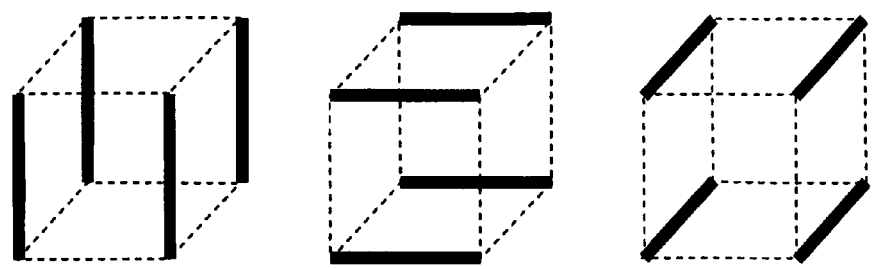
FIG. 4 illustrates how edges on a hexahedral element can be logically separated in to three sets each having an associated direction, in accordance with an embodiment of the invention.

Edge Group: FIG. 4 illustrates how the 12 edges on a hexahedral element can be divided into three sets of four edges. The four edges in each set are topologically parallel to each other (i.e. do not share any nodes, but have one or more common adjacent hexahedra), giving each hexahedra three logical directions. A sheet of hexahedra may be represented along a logical direction using its edge group representation.

Figure 5:
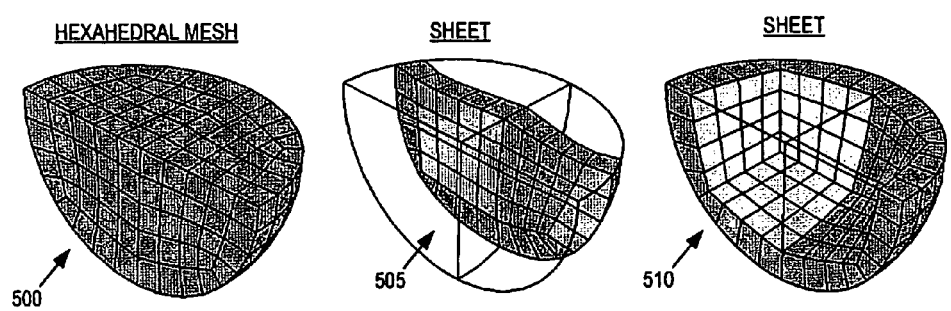
FIG. 5 illustrates two sheets within a hexahedral mesh, in accordance with an embodiment of the invention.

Hexahedral Sheet: A sheet in a hexahedral mesh is a collection of hexahedral elements which share opposite faces of the hexahedral elements in two separate directions creating a two dimensional surface, and which starts and stops on a terminal boundary of the mesh or loops back on itself. Two example sheets 505 and 510 within a hexahedral mesh 500 are illustrated in FIG. 5.

Letting M=(H,F,E,N) be a hexahedral mesh, D=(S,C,V) the associated dual, $h_i \in H$ one hexahedral element in M, and j be the index of one of the three logical directions in $h_i$, then a hexahedral sheet can also be defined as a logical layer of hexahedra having both a primal and a dual representation. The primal representation is the group of hexahedral elements, $H_S \subset H$, formed by traversal starting from the seed hex, $h_i$. From $h_i$ we traverse to the topologically parallel edges in the jth logical direction, and to their incident hexahedra. Traversal is repeated recursively to the topologically parallel edges in these incident hexahedra, and so forth. $H_S$ contains all hexahedra traversed. Let Esc E be the group of edges traversed to define $H_S$. The dual representation of a hexahedral sheet is a three-dimensional surface, $s_1 \in S$, interpolating the midpoint of each $e_i \in E_S$.

Figure 6A:
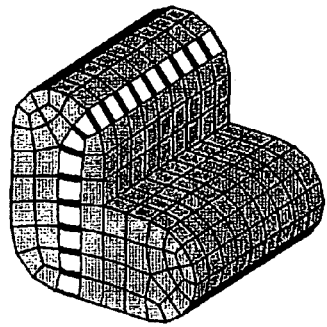
FIGS. 6A-C illustrate the three different representations of a sheet within a hexahedral mesh, in accordance with an embodiment of the invention.
Figure 6B:
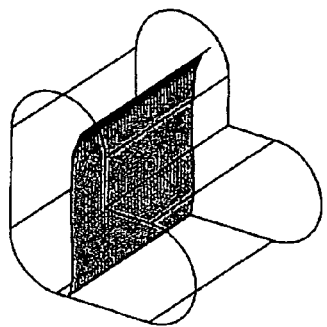
Figure 6C:
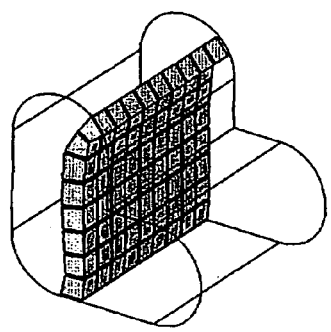

FIGS. 6A-C illustrate another example hexahedral sheet. FIG. 6A illustrates the edge group $E_S$, while FIGS. 6B and 6C illustrate the dual and primal representations, respectively. A sheet, $s_i$, can be classified as regular, self-intersecting, self-touching, or self-touching and self-intersecting.

Regular Sheet: Let M=(H,F,E,N) be a hexahedral mesh, D=(S,C,V) the associated dual, $s_1 \in S$ one dual sheet in D with corresponding hexahedra set $H_S$ and edge set $E_S$. Sheet, $s_i$, is "regular" iff for all edges $e_i \in E_S$, $e_i$ does not share either node with any other edge $e_j \in E_S$, $e_i \neq e_j$. Sheets 505 and 510 in FIG. 5 and the sheets illustrated in FIGS. 6B and 6C are regular sheets. A regular sheet is a non-self-touching and non-self-intersecting sheet (see definitions below).

Figure 7A:
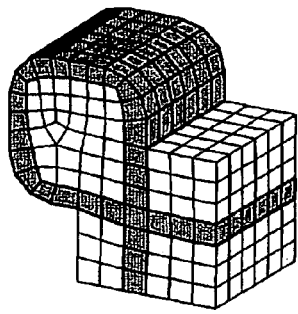
FIGS. 7A-C illustrate self-intersecting, self-touching, and self-intersecting and self-touching sheets within hexahedral meshes, in accordance with an embodiment of the invention.

Self-Intersecting Sheet: Let M=(H,F,E,N) be a hexahedral mesh, D=(S,C,V) the associated dual, $s_1 \in S$ one dual sheet in D with corresponding hexahedra set Hs and edge set $E_S$. Sheet, $s_i$, is "self-intersecting" iff there exists at least one edge, $e_i \in E_S$, which shares exactly one of its nodes with another edge, $e_j \in E_S$, $e_i \neq e_j$, and its other node with another edge $e_k \in E_S$, $e_k$, such that $e_i$, $e_j$, and $e_k$ are all incident to the same quadrilateral $q_i \in F$. FIG. 7A illustrates a self-intersecting sheet.

Figure 7B:
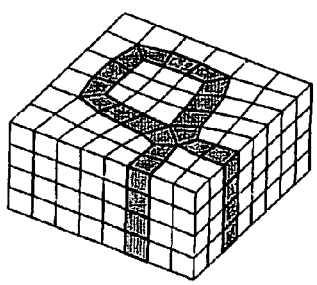

Self-Touching Sheet: Let M=(H,F,E,N) be a hexahedral mesh, D=(S,C,V) the associated dual, $s_1 \in S$ one dual sheet in D with corresponding hexahedra set $H_S$ and edge set $E_S$. Sheet, $s_i$, is "self-touching" iff there exists at least one edge, $e_i \in E_S$, which shares exactly one of its nodes with another edge, $e_j \in E_S$, $e_i \neq e_j$. FIG. 7B illustrates a self-touching sheet.

Figure 7C:
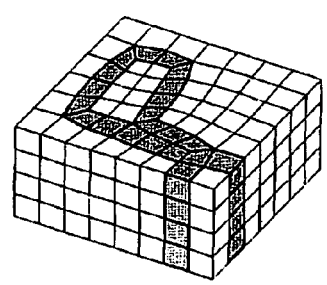

Self-Touching and Self-Intersecting Sheet: Let M=(H,F,E,N) be a hexahedral mesh, D=(S,C,V) the associated dual, $s_1 \in S$ one dual sheet in D with corresponding hexahedra set $H_S$ and edge set $E_S$. Sheet, $s_i$, is "self-touching and self-intersecting" iff it satisfies both definitions for self-intersecting and self-touching sheets above. FIG. 7C illustrates a self-touching and self-intersecting sheet.

Hexahedral Column (a.k.a. hexahedral chord): A hexahedral column is the 3D corollary to the 2D quadrilateral column or quadrilateral chord, and is yet another type of chord. A column of hexahedra is a collection of hexahedral mesh elements that form a chain of opposite faces on adjacent hexahedral elements and, which starts and stops on a terminal boundary of the mesh or loops back on itself. The intersection of two sheets forms a hexahedral column 800 as illustrated in FIG. 8. FIG. 9 illustrates an example hexahedral mesh and two of its hexahedral columns.

Let M=(H,F,E,N) be a hexahedral mesh, D=(S,C,V) the associated dual, and $q_i \in F$ one quadrilateral face in M. A "hexahedral column" is a single logical stack, or column of hexahedral elements, having both a primal and a dual representation. The primal representation is the group of hexahedral $H_C \subset H$ formed by traversal starting from the seed quadrilateral, $q_i$. From $q_i$ we recursively traverse through incident hexahedra, their topologically opposite quadrilateral faces from $q_i$, to their other incident hexahedra, and so forth. $H_C$ contains all hexahedra traversed. Hexahedral columns are formed at the intersection of two sheets, or at a sheet self-intersection. Thus, $H_C$ is the set of hexahedral elements which are contained in both sheets, $H_C = H_{S1} \cap H_{S2}$. The dual representation of a hexahedral column is the curve, $C_i \in C$, formed at the intersection of two dual sheets, $c_i = s_1 \cap s_2$.

As another example, FIG. 10A illustrates a simple hexahedral mesh with two highlighted sheets. FIG. 10B illustrates the primal representation of the intersection of the two sheets as a column of three hexahedral elements, all of which are in both highlighted sheets. FIG. 10C illustrates the dual representation of the two sheets which intersect to form a curve, defining the dual representation of chord $c_i$. Like sheets, chords can be regular, self-intersecting, self-touching, or self-touching and self-intersecting.

Hexahedral Mesh Element: A dual vertex, $v_i \in V$, is logically a single hexahedral element. As shown in FIG. 4 each hexahedral element has three logical directions. Each logical direction is associated with a dual sheet. In the general case, these three sheets are unique. However, in the case of self-intersecting sheets, these sheets can be non-unique. A dual vertex, $v_i$, is the point of intersection of the three dual sheets in element i, $v_i = s_1 \cap s_2 \cap s_3$. Each hexahedron is also the intersection of three hexahedral columns or chords. Thus, a dual vertex is also the point of intersection of the three dual chords in element i, $v_i = c_1 \cap c_2 \cap c_3$.

Figure 11:
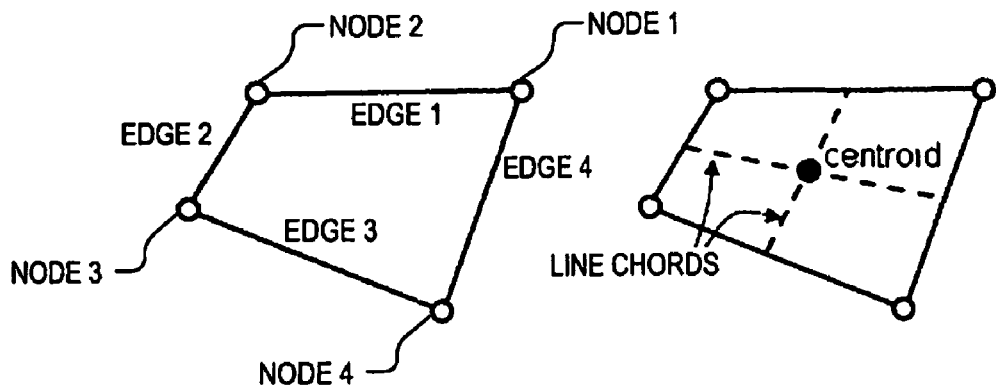
FIG. 11 illustrates a quadrilateral mesh element, in accordance with an embodiment of the invention.

Quadrilateral Mesh Element: FIG. 11 illustrates a single quadrilateral mesh element. As shown, it is defined by four nodes at each of its four corners, and four edges, which represent the sides of the mesh element. In a conforming quadrilateral mesh, each "internal" edge in the mesh is shared by exactly two quadrilateral elements. As such, given a quadrilateral element and one of its edges, it is easy to find the other quadrilateral attached to that edge. In addition, given a quadrilateral element, and one of its edges, it is easy to find the "opposite" edge or the other edge of the quadrilateral that does not share any nodes with the given edge. For example, in FIG. 11 edge 1 is opposite edge 3 and visa versa. Likewise, edge 2 is opposite edge 4.

Quadrilateral Mesh: A quadrilateral mesh is a two-dimensional FEM formed of a plurality of quadrilateral elements linked together on a planar or non-planar surface. The boundary of a hexahedral mesh is the set of quadrilaterals which have exactly one incident hexahedron. These quadrilaterals can be grouped based on their associated geometric surface. The elemental representation, comprised of quadrilaterals, edges, and nodes, is the primal representation of a quadrilateral mesh. For quadrilateral meshes, the dual representation is comprised of chords and vertices, D=(C,V).

Figure 12:
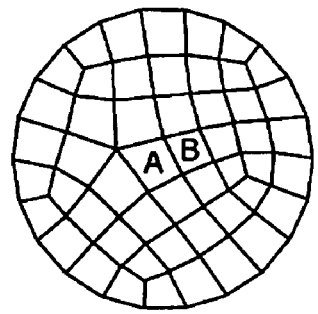
FIG. 12 illustrates a quadrilateral chord, in accordance with an embodiment of the invention.
Figure 13:
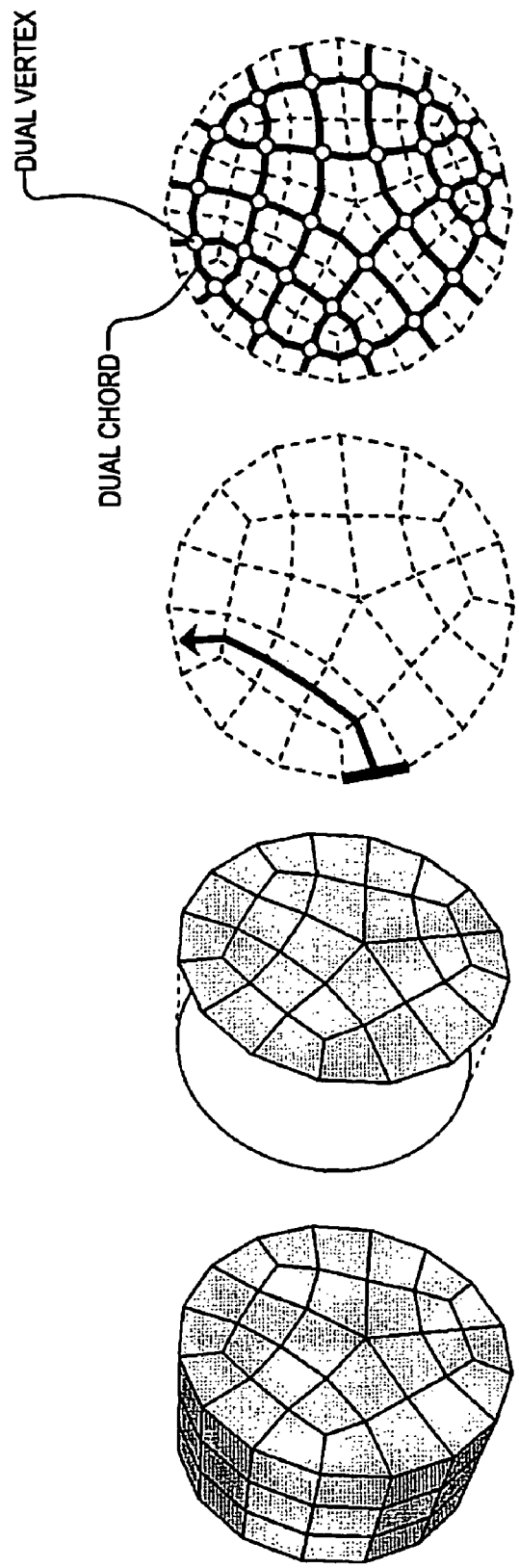
FIGS. 13A-D illustrate chords on a quadrilateral surface of a hexahedral mesh, in accordance with an embodiment of the invention.

Quadrilateral Chord:

A quadrilateral chord is a type of chord that is a collection of quadrilateral elements forming a chain connected through opposite edges that starts and stops on a boundary or loops back on itself. A quadrilateral chord is defined by selecting a starting edge in a quadrilateral mesh along with its two adjacent quadrilateral elements (elements A and B for example in FIG. 12). The opposite edges to the starting edge are then found in each adjacent element, along with their adjacent quadrilaterals. This propagation continues until edges on the terminal boundary of the mesh are found, or until the chord wraps back onto itself. Stated another way, in a quadrilateral mesh, a chord, $c_i$, is a logical row of quadrilateral elements. Each quadrilateral has two pairs of opposite edges. Given one edge, recursive propagation through adjacent quadrilaterals and opposite edges defines a set of edges $E_C$. The dual representation of a chord is the curve interpolating the midpoint of each edge in $E_C$. The primal representation of a chord is the set of quadrilaterals traversed to define the edge set $E_C$. FIG. 13C illustrates a single chord in the quadrilateral mesh on the boundary of FIG. 13A. In a quadrilateral mesh which is on the boundary of a hexahedral mesh, each chord has a uniquely associated hexahedral sheet defined by traversing the edges which are topologically parallel to edges in $E_C$ into the adjacent hexahedral mesh.

In a quadrilateral mesh, a vertex, $v_i$, is logically a single quadrilateral element. Each quadrilateral has two logical directions. Each logical direction defines a portion of a dual chord. The dual representation of a vertex, $v_i$, is the point of intersection of these two dual chord curves in element i, $v_1 = c_1 \cap c_2$. In a quadrilateral mesh on the boundary of a hexahedral mesh, each vertex, and its associated quadrilateral face, has a uniquely associated hexahedral column defined by traversing from the quadrilateral face through adjacent hexahedra and opposite quadrilaterals into the adjacent hexahedral mesh.

Quadrilateral Mesh Dual: The dual of a quadrilateral mesh has one dual chord for each logical row of quadrilateral elements, and one dual vertex for each quadrilateral element. FIG. 13D illustrates the complete dual for the quadrilateral mesh in FIG. 13B.

Chord: A chord is a collection of mesh elements connected through opposite edges and which starts and stops on a terminal boundary of the mesh or loops back on itself. There are several types of chords including line chords, quadrilateral chords, and hexahedral chords.

Line Chord: A line chord is a type of chord (e.g., dual chord). A line chord is a collection of lines connecting the midpoints of opposite edges of mesh elements and which starts and stops on a terminal boundary of the mesh or loops back on itself. FIG. 11 illustrates two line chords.

Conforming Mesh: A conforming mesh is a mesh which contains no "hanging nodes." A hanging node is a node that is spatially adjacent to a mesh element, but is not used as one of the corners or vertices of that mesh element. FIG. 14 illustrates conforming meshes 1405 and 1410 and a non-conforming mesh 1415 having hanging nodes in a localized region 1420 (shaded). Only a few FEM solvers support hanging nodes and non-conforming meshes. Even if the FEM solver does support hanging nodes, the solution in these regions is often compromised because of the discontinuity in the mesh connectivity. As a result, conforming meshes are usually preferred when modeling an apparatus.

Mesh Coarsening: Mesh coarsening is the act of reducing the number of mesh elements in a FEM.

Mesh Refinement: Mesh refinement is the action of increasing the number of mesh elements in a FEM.

FEM Operators

Once an FEM is generated, it can be modified in a variety of ways. Any change to the hexahedral element connectivity has corresponding changes to the associated dual representation. Likewise, modifications to the dual representation change the primal representation. The mesh matching technique discussed below modifies hexahedral element topology using three different operators: column collapsing, sheet extraction, and, sheet insertion.

Column Collapse: The column or chord collapse operator is defined as follows: Given a mesh M and its associated dual D=(S, C, V), a chord, $c_i \in C$, can be removed to form a new mesh M' and its associated D'=(S', C', V'), such that:

$$S' = S - \{s_1, s_2\} \cup \{s_1', s_2'\},$$

where $\{s_1, s_2\}$ are the two sheets intersecting at $c_i$ and $\{s_1', s_2'\}$ are the two sheets resulting from redefining $\{s_1, s_2\}$.

$$C' = C - \{c_1\} - \{c_1, c_2, \ldots, c_m\} + \{c_1', c_2', \ldots, c_n'\}, m, n > 0,$$

where $\{c_1, c_2, \ldots, c_m\}$ are the chords in $s_1$ and $s_2$ which intersect $c_1$, and $\{c_1', c_2', \ldots, c_n'\}$ are the chords in $s_1'$ and $s_2'$ which result from redefining the chords $\{c_1, c_2, \ldots, c_m\}$.

$$V' = V - \{v_1, v_2, \ldots, v_n\}, n > 0,$$

where $v_1$, $i \in [1, n]$, are the n vertices in $c_i$.

Practically, the column collapse operation is performed by merging one pair of opposite nodes of each quadrilateral defining the corresponding hexahedral column as illustrated in FIGS. 15A-E. FIG. 15A illustrates a mesh with a single hexahedral column $c_i$ highlighted. FIG. 15B illustrates the two sheets, $s_1$ and $s_2$, which intersect to form the column $c_1$. FIG. 15C illustrates the column partially collapsed. FIG. 15D illustrates the two new sheets, $s_1'$ and $s_2'$, formed when the collapse reconnects $s_1$ and $s_2$. Since each chord is the intersection of two sheets, the removal of $c_i$ redefines the sheets to remove the intersection. In addition, all $v_i$ at intersections of $c_i$ with all sheets in D are also removed. Collapsing self-intersecting columns creates doublets and should be avoided.

Figure 16A:
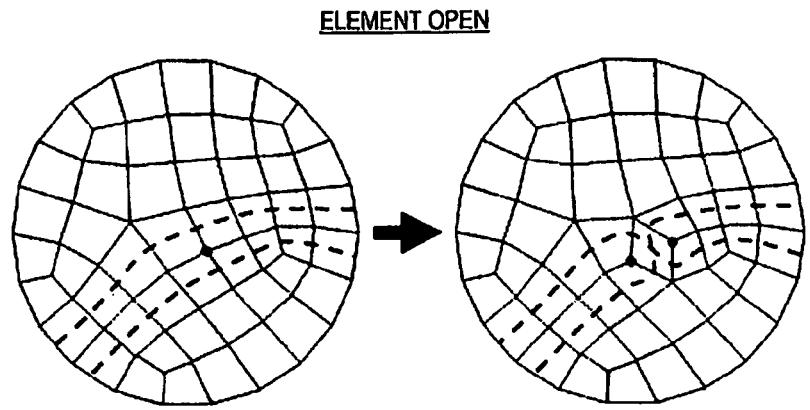
FIGS. 16A, B illustrate a column open operation, in accordance with an embodiment of the invention.
Figure 16B:
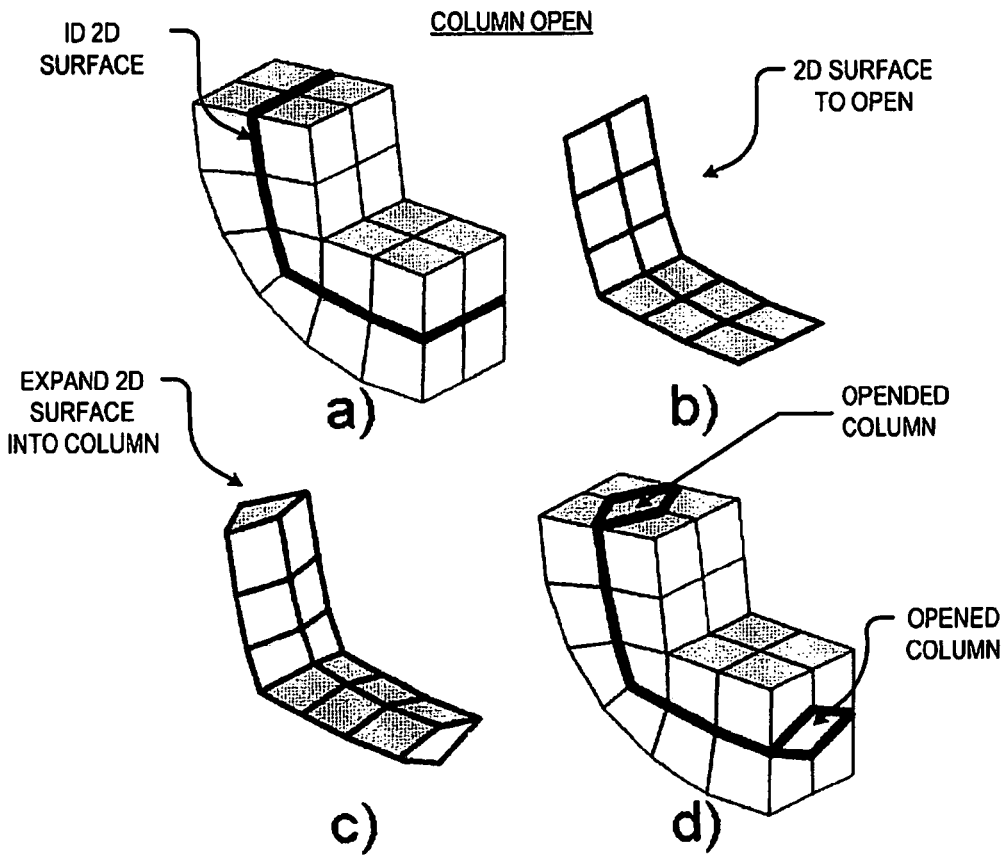

Column Open: The column open operation has the inverse affect of the column collapse operation. In a quadrilateral plane, two dual chords which previously did not cross can be redirected so that they do cross as illustrated in FIG. 16A. The "column open" operation is the 3D corollary operation for inserting a hexahedral column into a hexahedral mesh as illustrated in FIG. 16B. In the column open operation, a 2D surface of quadrilaterals (quadrilateral column) is identified. The 2D surface is then opened by expanding a series of nodes within the identified quadrilateral column into two separate sets of nodes to create the opened column.

Sheet Extraction: Sheet extraction is defined as follows: Given a hexahedral mesh M and its associated dual D=(S, C, V), a sheet, $s_i \in S$, can be removed from M to form a new mesh M' and its associated D'=(S', C', V'), such that:

$$S' = S - \{s_i\}$$

$$C' = C - \{c_1, c_2, \ldots, c_m\}, m > 0,$$

where $c_i$, $i \in [1, m]$, are the intersections between $s_i$ and itself and other $s_j \in S$.

$$V' = V - \{v_1, v_2, \ldots, v_n\}, n > 0,$$

where $V_i$, $i \in [1, n]$, are the intersections between $s_i$ and itself and other $c_j \in C$.

Figure 17:
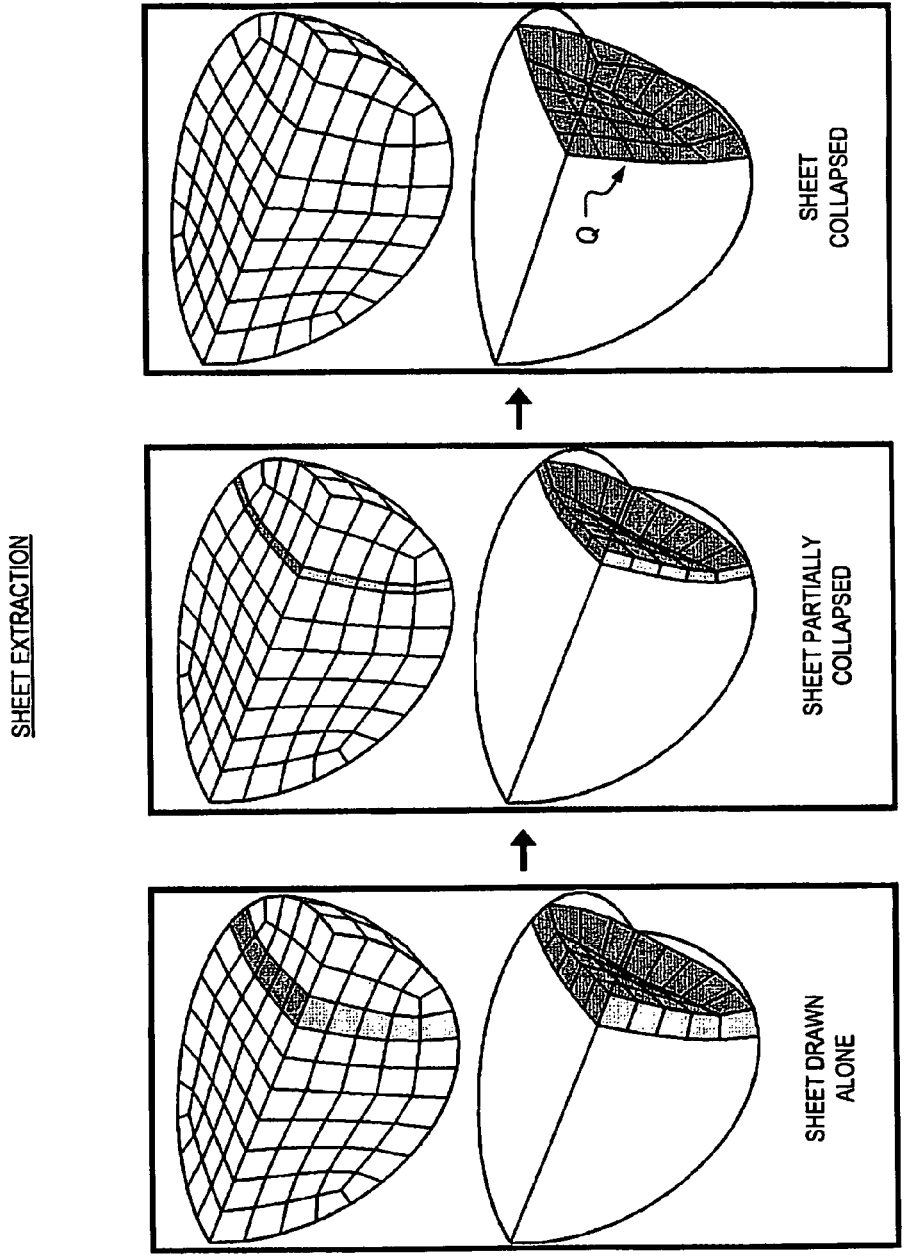
FIG. 17 illustrates a sheet extraction operation, in accordance with an embodiment of the invention.

$s_i$ is extracted from M by collapsing all $e_i \in E_S$, in the definition of $s_i$, as illustrated in FIG. 17. Collapsing the edges reduces the primal representation of the sheet to a continuous set of quadrilaterals, Q. For regular sheets, Q is manifold. If the sheet is self-intersecting or self-touching, Q is non-manifold. In some cases, sheet extraction results in invalid geometric nodal associativity. When collapsing an edge in a sheet, the edge's two nodes are merged. If the two nodes have conflicting geometric associativity (i.e., nodes are associated with different curves in the geometry, etc.), extraction of the sheet will lead to invalid geometric nodal associativity. In addition, low node valence in the region of the sheet extraction can sometimes lead to doublets, resulting in ill-shaped elements with zero or negative scaled Jacobians.

Sheet Insertion: Sheet insertion is defined as follows: Given a hexahedral mesh M and it's associated dual D=(S, C, V), a new sheet, $s_i \notin S$, can be inserted into M to form a new mesh M' and it's associated D'=(S', C', V'), such that:

$$S' = S \cup \{s_i\}$$

$$C' = C \cup \{c_1, c_2, \ldots, c_m\}, m > 0,$$

where $c_i$, $i \in [1, m]$, are the intersections between $s_i$ and itself and other $s_j \in S$.

$$V' = V \cup \{v_1, v_2, \ldots, v_n\}, n > 0,$$

where $v_i$, $i \in [1, n]$, are the intersections between $s_i$ and itself and other $c_j \in C$.

Two conventional techniques for inserting sheets into a mesh include pillowing and dicing (discussed below). Another more general technique in accordance with an embodiment of the invention, is sheet inflation (discussed in its own section below).

Figure 18C:
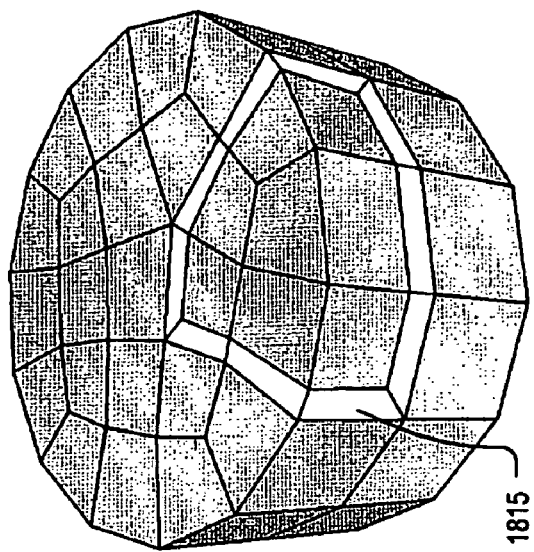
FIGS. 18A-C illustrate a sheet insertion operation via pillowing, in accordance with an embodiment of the invention.
Figure 18B:
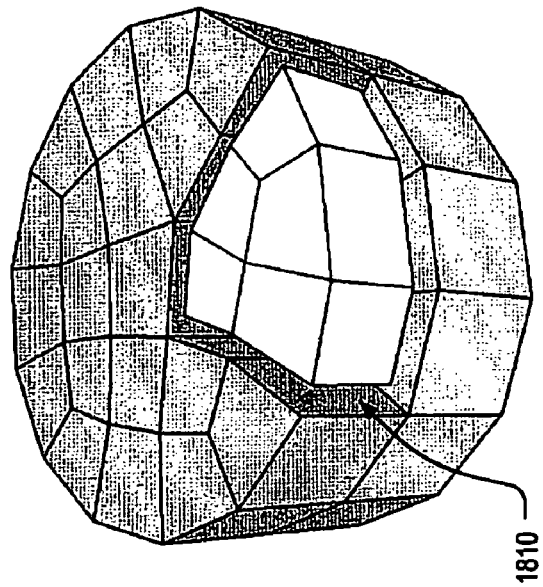
Figure 18A:
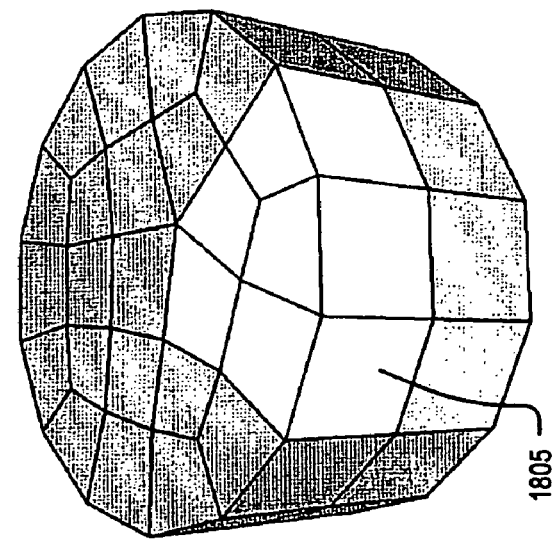

Pillowing: In pillowing, a simply connected subset of the hexahedra in a mesh are defined as a shrink set 1805 (FIG. 18A). The elements in the shrink set are detached from all adjacent hexahedra not included in the shrink set, duplicating the nodes along the interface. The nodes in the shrink set are then shrunk towards the interior of the shrink set (FIG. 18B) creating a gap 1810 between the shrink set and the remainder of the mesh. This gap is filled with a new sheet 1815 of hexahedral elements (FIG. 18C) by creating edges between the original nodes and their duplicate nodes. The new sheet 1815 is always a regular sheet. Pillowing is always possible if the shrink set contains only face-connected hexahedra.

Figure 19:
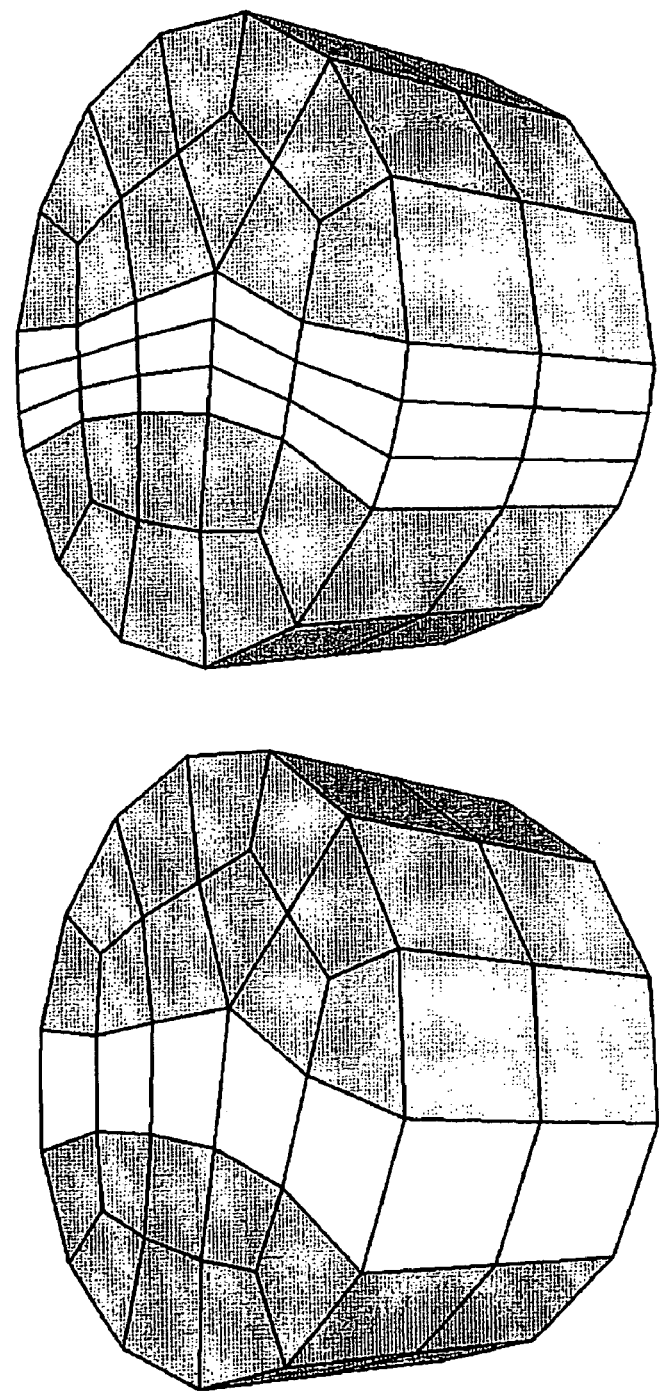
FIG. 19 illustrates a sheet insertion operation via dicing, in accordance with an embodiment of the invention.

Dicing: Dicing is performed by splitting the edges, $E_S$, that define an existing dual sheet. Dicing can insert multiple sheets at once by splitting each edge multiple times (FIG. 19). The new sheets inserted with dicing are duplicates of the input sheet; if the input sheet is self-intersecting, the new sheets will also be self-intersecting. The disadvantage of dicing is that it can only copy existing sheets; dicing cannot create new sheets that did not already exist in the mesh. In addition, dicing cannot create self-touching sheets.

Sheet Inflation

The mesh matching technique presented below can be enhanced with the ability to insert a wide variety of sheet configurations. Conventional dicing and pillowing only partially cover the spectrum of possible sheet insertions. Neither allows the insertion of arbitrary self-touching sheets, arbitrary self-intersecting sheets, and several theoretical sheets. In reality, self-intersecting and self-touching sheets are rare, and may indicate poor element quality. Thus insertion of self-touching and self-intersecting sheets should be avoided when possible. However, the sheet inflation operator extends the functionality spectrum by enabling the insertion of both arbitrary self-intersecting and arbitrary self-touching sheets in those less common instances when desirable.

Inflatable Quadset: Let M=(H,F,E,N) be a hexahedral mesh. An inflatable quadset, Q, is a continuous set of quadrilaterals of size $n_q$, $Q \subset F$, which terminates on the boundary or closes upon itself into a ball. Q can be either manifold or non-manifold.

Figure 20:
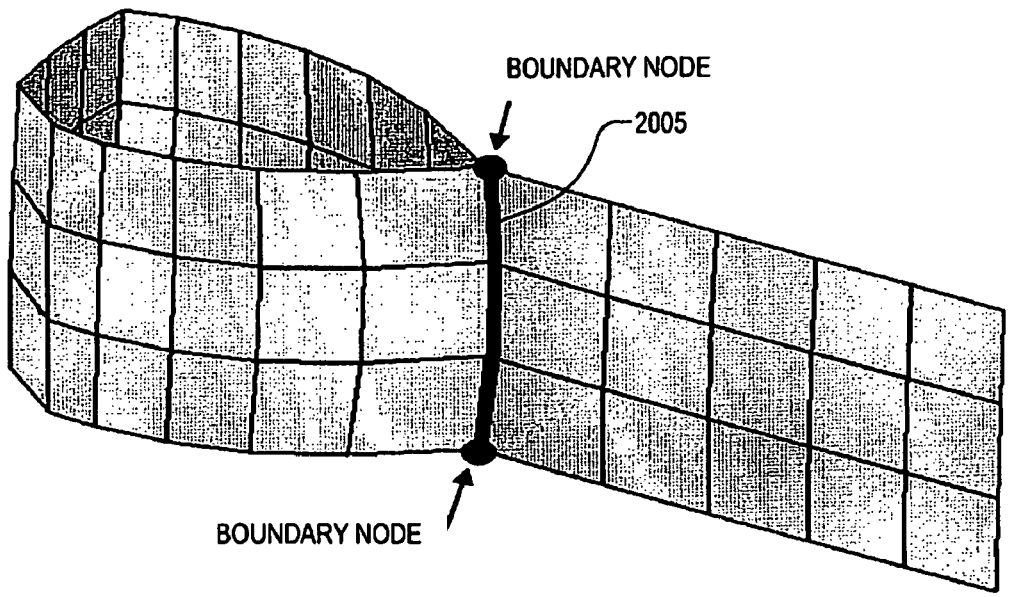
FIG. 20 illustrates a three non-manifold edge set (3NMEset), in accordance with an embodiment of the invention.

3NMEset: Let M=(H,F,E,N) be a hexahedral mesh, and Q an inflatable quadset, $Q \subset F$. A three non-manifold edge set ("3NMEset") is a set of simply connected mesh edges, $E_i^Q \subset E^Q$, such that all $e_i \in E_i^P$ are incident to exactly three $f_j \in Q$. FIG. 20 illustrates a 3NMEset 2005. The edges in a 3NMEset are each shared by three adjacent quadrilaterals in an FEM. The edges in a 3NMEset terminate at nodes on the boundary, or form a single continuous circular loop. Each 3NMEset is paired with another 3NMEset, or with a set of boundary edges.

Figure 21:
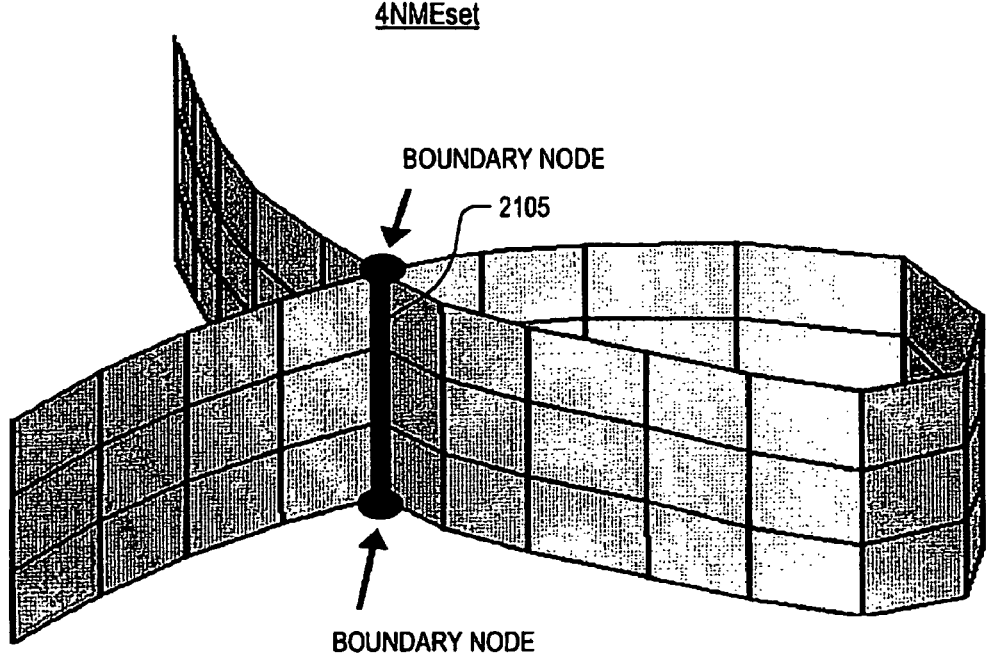
FIG. 21 illustrates a four non-manifold edge set (4NMEset), in accordance with an embodiment of the invention.

4NMEset: Let M=(H,F,E,N) be a hexahedral mesh, and Q be an inflatable quadset, $Q \subset F$. A four non-manifold edge set ("4NMEset") is a set of simply connected mesh edges, $E_i^Q \subset E^Q$, such that all $e_i \in E_i^Q$ are incident to exactly four $f_j \in Q$. FIG. 21 illustrates a 4NMEset 2105. The edges in a 4NMEset are each shared by four adjacent quadrilaterals in an FEM. The edges in a 4NMEset terminate at nodes on the boundary, or form a single continuous circular loop. Likewise, 5NMEsets, 6NMEsets, etc. could be defined; however, taking a pragmatic approach to sheet inflation, 3NMEsets and 4NMEsets are typically sufficient. With the above three definitions, sheet inflation is explained below.

Sheet Inflation:

Given a mesh M=(H,F,E,N), with associated dual D=(S,C,V), and an inflatable quadset Q of size $n_g$, $Q \subset F$, we define:

- A set of nodes, $N^Q$, of size $n_n$, which contains all nodes incident to any $f_j \in Q$.
- A set of edges, $E^Q$, of size $n_e$, which contains all edges incident to any $f_j \in Q$. Each $e_i \in E^Q$ is either a boundary edge, or incident to two or more $f_j \in Q$.
- Any number of 3NMEsets and/or 4NMEsets at the non-manifold edges in Q.

Sheet inflation creates a new mesh, M'=(H', F', E', N') with associated dual, D'=(S', C', V'), such that:

$$H' = H \cup \{h_1, h_2, \ldots, h_{m_q}\}, m_q \leq n_q,$$

where $\{h_1, h_2, \ldots, h_{m_q}\}$ are one or more hexahedral elements $\forall f_i \in Q$.

$$F' = F \cup \{f_1, f_2, \ldots, f_{m_e}\}, m_e \geq n_e,$$

where $\{f_1, f_2, \ldots, f_{m_e}\}$ are one or more quadrilateral faces $\forall e_i \in E^Q$.

$$E' = E \cup \{e_1, e_2, \ldots, e_{m_n}\}, m_n \geq n_m,$$

where $\{e_1, e_2, \ldots, e_{m_n}\}$ are one or more mesh edges $\forall n_i \in N^Q$.

$$N' = N \cup \{n_1, n_2, \ldots, n_{m_n}\}, m_n \geq n_n,$$

where $\{n_1, n_2, \ldots, n_m\}$ are one or more node $\forall n_i \in N^Q$.

D→D' as defined in the Sheet Insertion paragraph above, where the new sheet, $s_i$, is a new sheet which interpolates the midpoints of $\{e_1, e_2, \ldots, e_{m_n}\}$.

In practice, sheet inflation is the inverse of sheet extraction, which reduces a sheet to a continuous set of quadrilaterals (FIG. 17). This process can be reversed by inflating the quadrilaterals to re-introduce the extracted sheet. During sheet inflation, each quadrilateral in Q is inflated into one or more hexahedral elements (two or more in regions where the new sheet is self-touching, and one elsewhere).

Regular sheets are inserted by inflating a manifold set Q. When Q is manifold, $m_q = n_q$, $m_e = n_e$, and $m_n = n_n$. Pillowing (see FIG. 18) is a special case of sheet inflation where Q is the manifold set of quadrilaterals on the boundary of the shrink set. Dicing (see FIG. 19) is another special case of sheet inflation where Q includes one face from every hexahedron in the sheet to dice.

Self-touching sheets are inserted when Q is non-manifold. When Q is non-manifold:

$$m_q = n_q + n_{nmq},$$

where $n_{nmq}$ is the number of quadrilaterals bound by a pair of 3NMEsets.

$$m_e = n_e + n_{nme},$$

where $n_{nme}$ is the number of non-manifold edges in $E^Q$ plus the number of edges incident to any quadrilateral bound by a pair of 3NMEsets.

$$m_n = n_n + n_{nmn},$$

where $n_{nmn}$ is the number of nodes attached to any non-manifold edge in $E^Q$ plus the number of nodes incident to any quadrilateral bound by a pair of 3NMEsets.

Self-intersecting sheets are inserted by first inserting a self-touching sheet with a non-manifold Q, followed by a column open operation at any 3NMEset or 4NMEset which needs to be self-intersecting in the new sheet, as illustrated in the following sheet inflation examples.

Figure 22A:
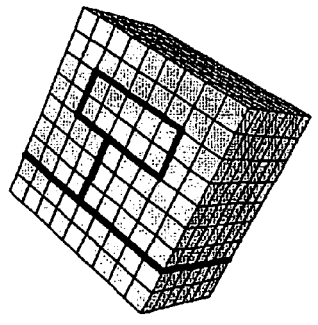
FIGS. 22A-D illustrate a 3NMEset sheet insertion operation via sheet inflation, in accordance with an embodiment of the invention.
Figure 22B:
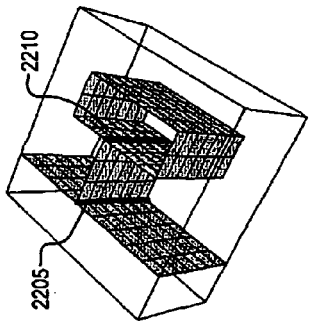
Figure 22C:
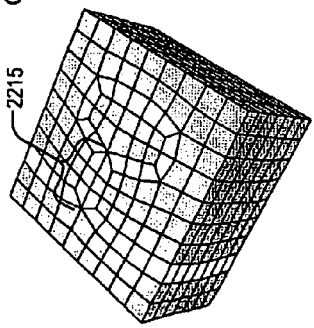
Figure 22D:
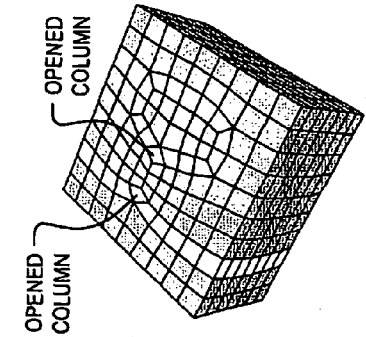
Figure 23A:
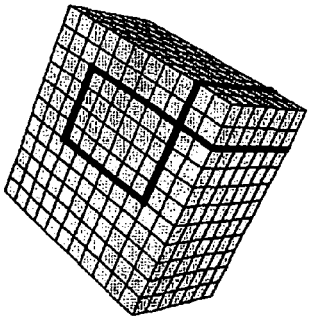
FIGS. 23A-D illustrate a 4NMEset sheet insertion operation via sheet inflation, in accordance with an embodiment of the invention.
Figure 23B:
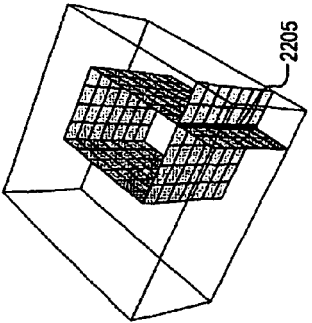
Figure 23C:
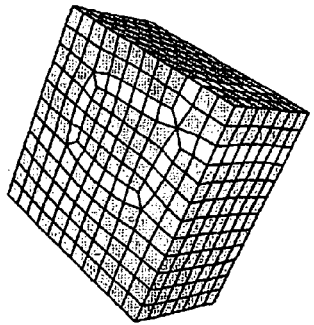
Figure 23D:
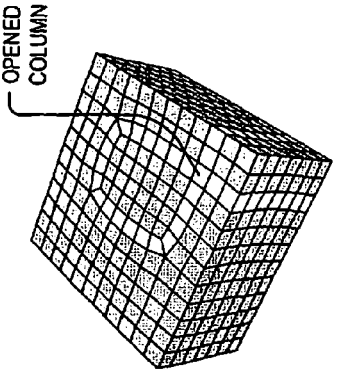

Sheet Inflation Example #1:

FIGS. 22A-D illustrate sheet inflation using two 3NMEsets 2205 and 2210. The quadrilaterals 2215 between the two 3NMEsets are duplicated twice (FIG. 22C). During sheet inflation, the 3NMEsets are inflated as self-touching (FIG. 22C), but can be converted to self-intersecting with a column open operation (FIG. 22D). 3NMEsets appear in pairs or are paired with a boundary.

Sheet Inflation Example #2:

FIGS. 23A-D illustrate sheet inflation using a single 4NMEset 2305. 4NMEset 2205 is inflated as self-touching (FIG. 23C), but can also be converted to self-intersecting with a column open operation (FIG. 23D), if desired. Thus a non-manifold edge set can be inflated in two different ways—self-touching or self-intersecting. The input to sheet inflation for each 3NMEset or 4NMEset may include a flag indicating which option should be performed.

Figure 24C:
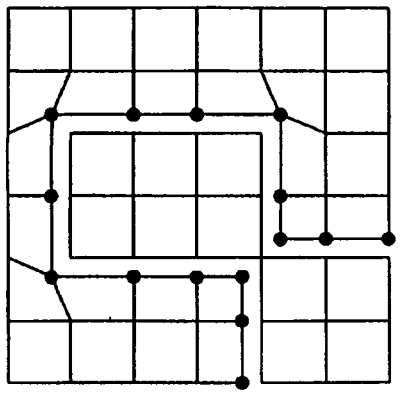
FIGS. 24A-E illustrate node duplication during insertion of a sheet having a 4NMEset via sheet inflation, in accordance with an embodiment of the invention.
Figure 24B:
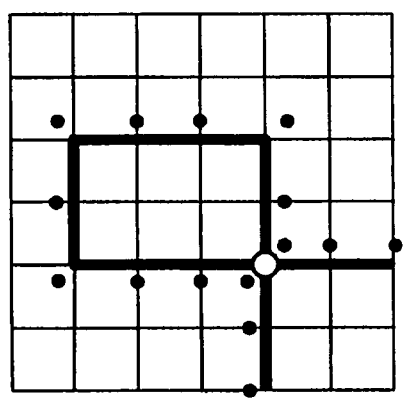
Figure 24A:
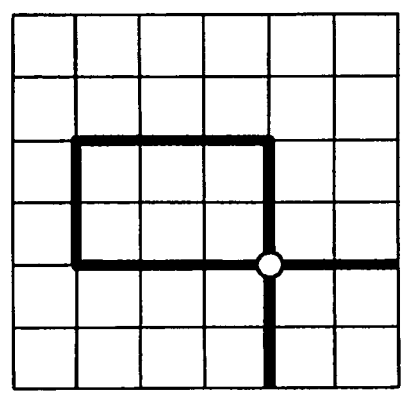
Figure 24E:
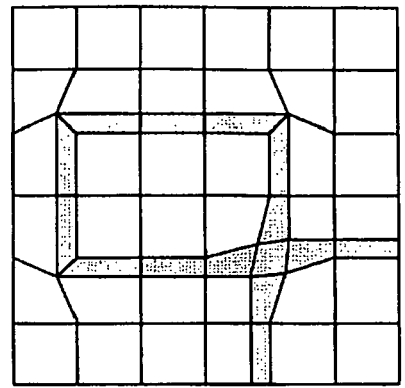
Figure 24D:
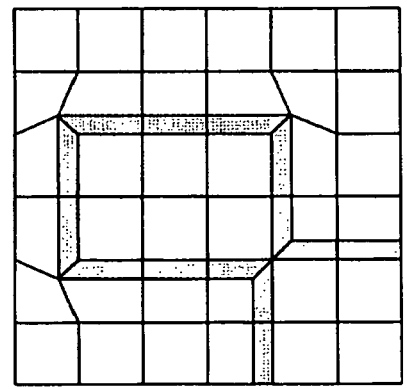

Node Duplication:

FIGS. 24A-E illustrate the inflation of a set Q with a 4NMEset by examining a cross-section of a hexahedral mesh. In 24A, the bold edges are the cross-section of the set Q being inflated. The white dot is a node in the 4NMEset which runs into the plane of the drawing. In FIG. 24B, the nodes in $N^Q$ are duplicated and offset perpendicular to Q. The nodes in the 4NMEset are duplicated twice. In FIG. 24C, the hexahedra on one side of Q are detached and re-attached to the duplicate nodes creating a gap. In FIG. 24D, the gap is filled with a self-touching sheet. If a self-intersecting sheet is desired instead, a column open can be performed along the 4NMEset as illustrated in FIG. 24E. Smoothing can then be done to improve element quality.

Figure 25C:
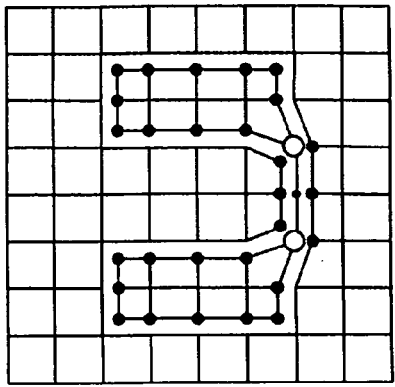
FIGS. 25A-E illustrate node duplication during insertion of a sheet having a 3NMEset via sheet inflation, in accordance with an embodiment of the invention.
Figure 25B:
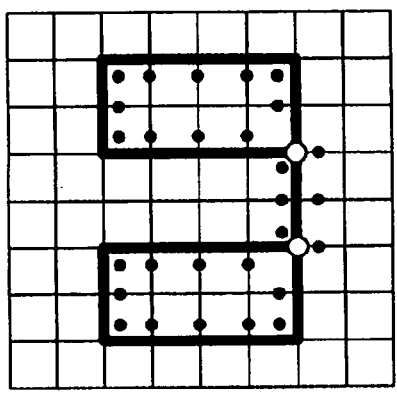
Figure 25A:
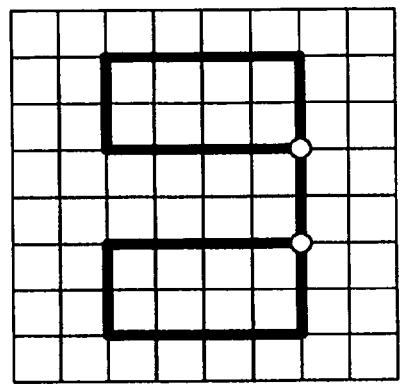
Figure 25E:
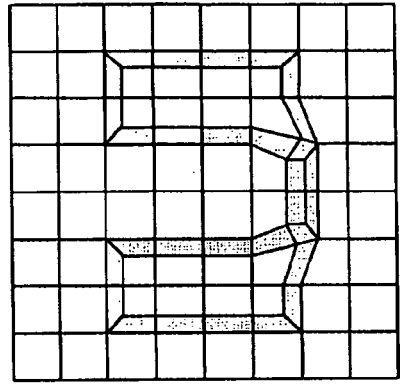
Figure 25D:
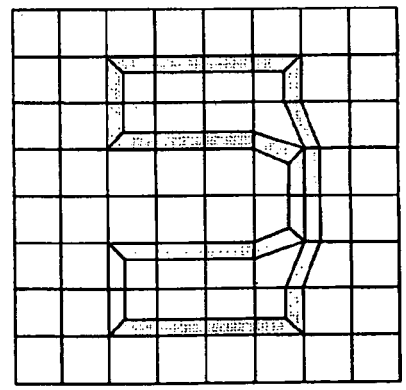

FIGS. 25A-E illustrate the inflation of a set Q with two 3NMEsets on a cross-section through a hexahedral mesh. The two white dots in FIG. 25A are a pair of 3NMEsets running into the plane of the drawing. In FIG. 25B, the nodes in $N^Q$ are duplicated. The nodes in the 3NMEset are duplicated twice. Similarly, the nodes which lie on the quadrilaterals between the two 3NMEsets are also duplicated twice. In FIG. 25C, the hexahedra on one side of Q are detached and re-attached to the duplicate nodes creating a gap. Two gaps are created between the paired 3NMEsets. In FIG. 25D, the gap is filled with a single self-touching sheet. Optionally, a column open can be performed along one or both of the 3NMEsets to form a self-intersecting and self-touching sheet (FIG. 25E). Smoothing could then be done to improve element quality.

Sheet inflation can be implemented in a manner similar to pillowing, with the following differences caused by the non-manifold edge sets: 1) nodes along non-manifold edge sets are duplicated twice for self-touching sheets (see FIGS. 24B and 25B), and 2) quadrilaterals and nodes which lie between a pair of 3NMEsets are duplicated twice, and the resulting gap filled with two hexahedra instead of one (see FIGS. 25A-E).

Mesh Matching

The sections above define a number of different types of FEM elements and present operations that can be used to modify the primal and dual mesh representations. These concepts can be combined into a technique called "mesh matching" to either convert a non-conforming interface between two portions of a mesh into a conforming interface or to merge two separate meshes, each representing a subcomponent of a larger assembly, along interface surfaces that are initially non-conforming with one another into conforming interface surfaces, thereby generating a merged conforming mesh of the complete assembly. In other words, mesh matching can convert non-conforming hexahedral-to-hexahedral interfaces (see FIG. 26A) into conforming hexahedral-to-hexahedral interfaces (see FIG. 26B). Mesh matching locally modifies the topology of the hexahedral elements on one or both sides of the interface to create a one-to-one pairing of nodes and a one-to-one pairing of quadrilateral faces on the interface surfaces allowing the meshes to be merged into a conforming mesh across the interface. As with any mesh modification procedure, in some circumstances, the quality of the modified elements may be reduced from the initial mesh quality. However, assuming the element quality remains above prescribed element quality thresholds, the benefits of having a conforming mesh may compensate for the reduction in element quality.

Robust automated mesh matching will allow adjacent components of an assembly to be meshed completely independent of each other since the resulting non-conforming interfaces can be converted to conforming interfaces as a post-processing procedure. As a secondary benefit, for some applications, mesh matching provides an alternative to the artificial constraints of multi-point constraints, gap elements, mortar formulations, etc.

Figure 26A:
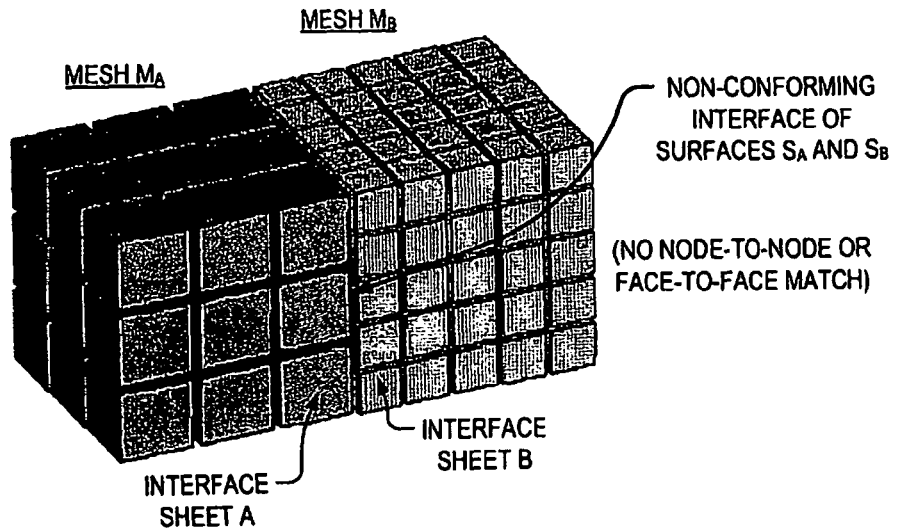
FIGS. 26A, B illustrate the conforming of a non-conforming interface between two three-dimensional FEMs using mesh matching, in accordance with an embodiment of the invention.
Figure 26B:
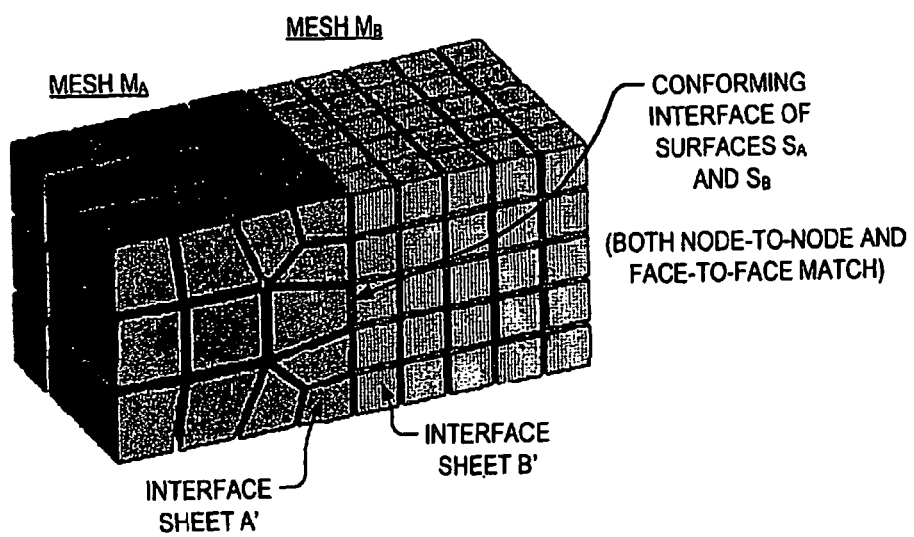

To begin with, the meshes illustrated in FIG. 26A are hexahedral meshes $M_A$ and $M_B$ having interface sheets A and B adjacent to surfaces $S_A$ and $S_B$, respectively, at a non-conforming interface. Further, $D_A = (C_A, V_A)$ and $D_B = (C_B, V_B)$ are defined to be the duals of the boundary quadrilateral meshes on surfaces $S_A$ and $S_B$. Initially $D_A \neq D_B$ (i.e., non-conforming). Mesh matching modifies the hexahedral elements in $M_A$ and/or $M_B$ by modifying the chords in $D_A$ and/or $D_B$ until $D_A = D_B$. Two quadrilateral duals, $D_A = (C_A, V_A)$ and $D_B = (C_B, V_B)$, are equal iff:

Every $c_i \in C_A$ is paired uniquely with a $c_j \in C_B$ and vice versa, creating chord pairs, $P_C(c_i, c_j)$ Every $v_i \in V_A$ is paired uniquely with a $v_j \in V_B$ and vice versa, creating vertex pairs, $P_V(v_i, v_j)$, and $\forall \, P_V(v_A, v_B), v_A = c_1 \cap c_2, v_B = c_3 \cap c_4 \rightarrow P_C(c_1, c_3)$ and $P_C(c_2, c_4)$ OR $P_C(c_2, c_3)$ and $P_C(c_1, c_4)$, which ensures equivalent chord topology in $D_A$ and $D_B$.

Figure 29:
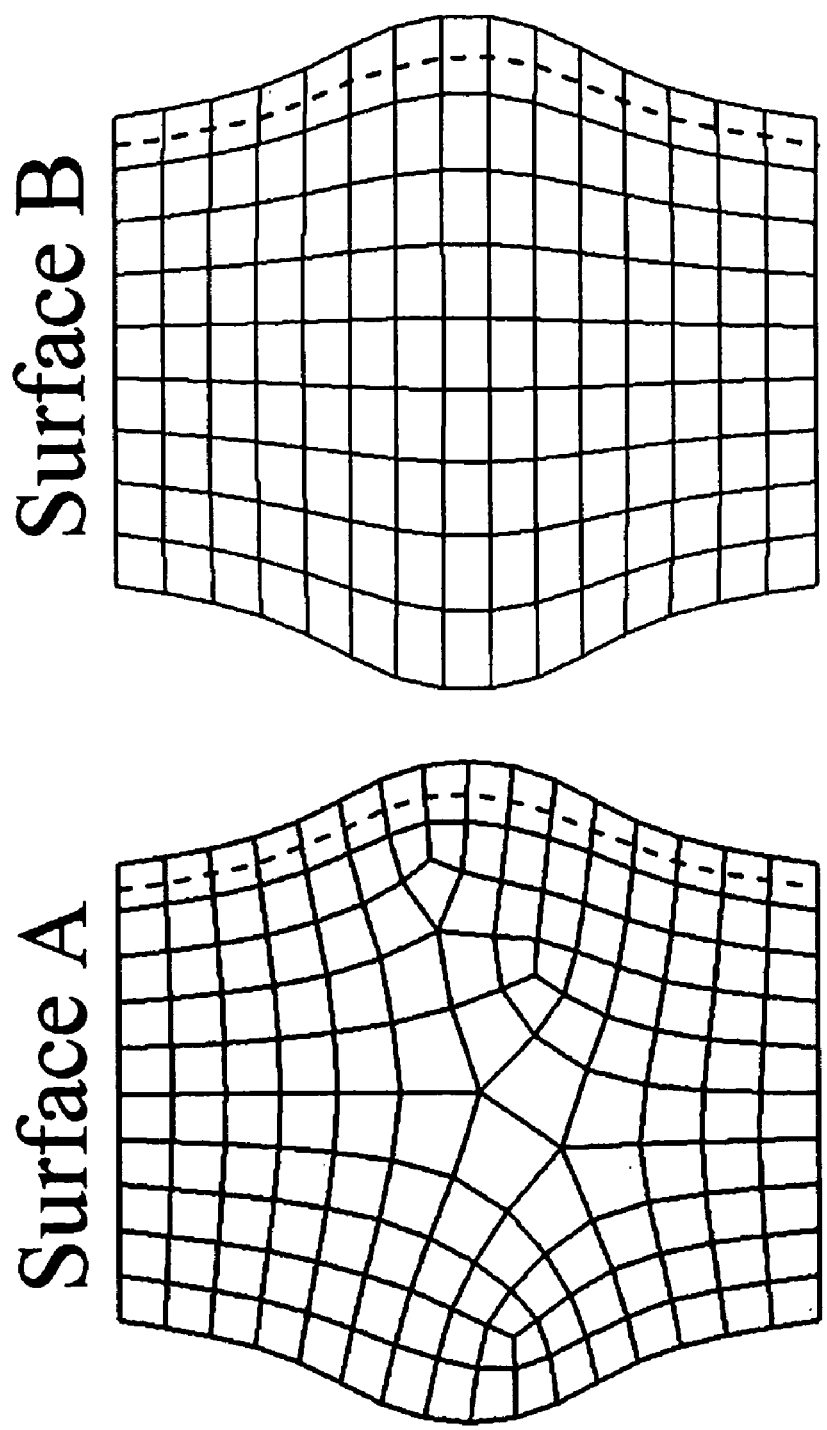
FIG. 29 illustrates quadrilateral surfaces at the interface between to hexahedral meshes, in accordance with an embodiment of the invention.

In practice, the process of mesh matching is the process of building chord pairs $P_C(c_i, c_j)$. Two chords, $c_i$ and $c_j$, can be paired iff $c_j = c_i$ within a tolerance, $\delta$ (e.g., $\delta <$ a mesh element size in the chord being paired). $c_i = c_j$ within a tolerance, $\delta$, iff.

$$D_A = (C_A, V_A), D_B = (C_B, V_B), D_A \neq D_B, c_i \in C_A, c_j \in C_B,$$

the maximum separation distance between $c_i$ and $c_j$ is less than $\delta$, and if $\exists c_k \in C_A, c_g \in C_B$ such that $c_k = c_g, c_k \cap c_i \neq \emptyset \rightarrow c_g \cap c_j \neq \emptyset$ The above does not require $c_i$ and $c_j$ to have the same number of dual vertices, although they will once all chords in $D_A$ and $D_B$ are paired. Rather, $c_i = c_j$ if the two chords are spatially close to each other, and consistently intersect other chord pairs. For example, in FIG. 29 the two indicated chords (dashed lines) have 16 and 15 chord vertices. However, when the two surfaces are overlaid, the maximum separation distance between the two chords is less than $\delta$. Thus, these two chords are deemed equal and paired.

There are three basic operations used to uniquely pair all $c_i \in C_A$ with a $c_j \in C_B$. First, the initial sets of $c_i \in C_A, c_j \in C_B$ are compared to see if any initial matches can be made before any mesh modifications are performed. Second, an unpaired chord in $C_A$ can be paired with a new chord inserted into $C_B$ with sheet insertion and vice versa. Third, an unpaired chord in either $C_A$ or $C_B$ can be removed with sheet extraction eliminating the need to consider it. If modifications are only allowed on one side of the interface, either $M_A$ or $M_B$ can be marked as un-modifiable.

In one embodiment, mesh matching alternates between sheet extractions and sheet insertions. This causes element densities to remain roughly unchanged. If $\Delta_A$ and $\Delta_B$ are defined to be the initial mesh densities in $M_A$ and $M_B$, respectively, then if both $M_A$ and $M_B$ are modifiable, the mesh density on the interface after mesh matching will approximate the average of $\Delta_A$ and $\Delta_B$. If $M_A$ is un-modifiable, the mesh density on the interface will be equal to $\Delta_A$ since all changes are restricted to be made in $M_B$. Likewise, if $M_B$ is un-modifiable, all changes will be made in $M_A$, resulting in a final interface mesh density of $\Delta_B$.

Figure 27:
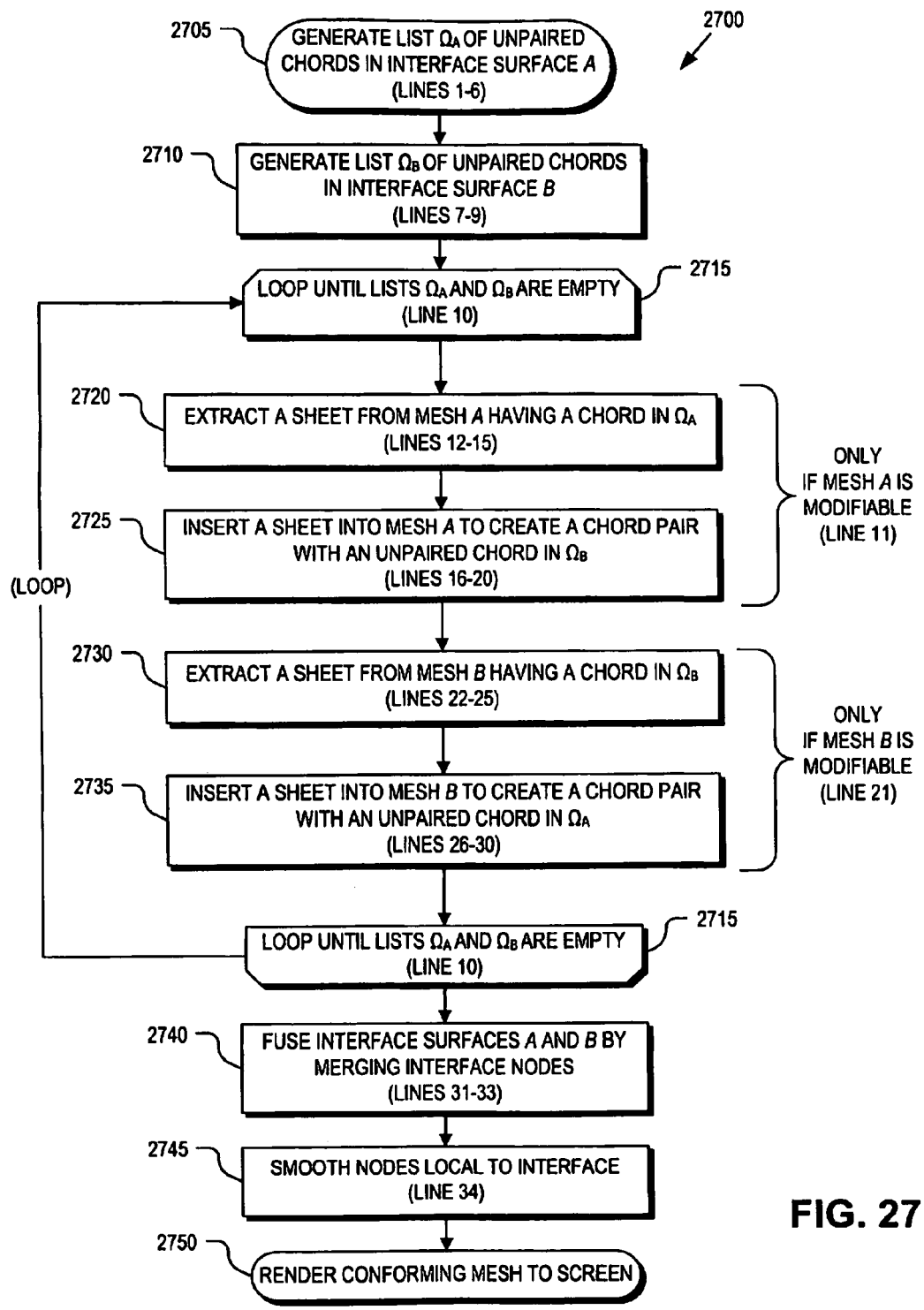
FIG. 27 is a flow chart illustrating a process for mesh matching, in accordance with an embodiment of the invention.

FIG. 27 is a flow chart illustrating a process 2700 for mesh matching the interface between two hexahedral meshes, in accordance with an embodiment of the invention. Process 2700 is explained with reference to the meshes $M_A$ and $M_B$ illustrated in FIGS. 26A and 26B and the pseudo code presented in FIG. 28. The order in which some or all of the process blocks appear in process 2700 should not be deemed limiting. Rather, one of ordinary skill in the art having the benefit of the present disclosure will understand that some of the process blocks may be executed in a variety of orders not illustrated.

In order to apply mesh matching to conform interface surfaces $S_A$ and $S_B$ of two meshes $M_A$ and $M_g$ the topological boundaries delimiting the two surfaces (e.g., number of boundary curves, loops, and vertices defining the outline of the two surfaces) should be identical. Similarly, the two surfaces $S_A$ and $S_B$ should be geometrically similar. To be geometrically similar, the boundary curves/vertexes on $S_A$ should align with the boundary curves/vertexes of $S_{13}$ within a tolerance $\beta$ (e.g., a fraction of an element size or less). If topological and geometrical similarities are not initially present, the boundaries of the interface surfaces $S_A$ and $S_B$ can be imprinted onto each other prior to mesh matching such as is done in the conventional technique of grafting.

Once the interface surfaces $S_A$ and $S_B$ at a non-conforming interface between meshes $M_A$ and $M_B$ have been identified and their topologies and geometries determined to be suitable, mesh matching can commence. In a process block 2705 (pseudo code lines 1-6), a list $\Omega_A$ of unpaired chords in interface surface $S_A$ is compiled. In one embodiment, list $\Omega_A$ is generated by searching for chords within interface surface $S_A$ that fall within a threshold separation distance $\delta$ from corresponding chords within interface surface $S_B$ along the interface. Those chords in interface surface $S_A$ for which a counterpart chord in interface surface $S_B$ is found are paired. The remaining chords in interface surface $S_A$ are added to list $\Omega_A$. In a process block 2710 (pseudo code lines 7-9), the unpaired chords remaining in interface surface $S_B$ are also placed into a list $\Omega_B$.

Once lists $\Omega_A$ and $\Omega_B$ have been generated, process 2700 enters a loop 2715 (pseudo code line 10) that continues until both lists $\Omega_A$ and $\Omega_B$ are empty, either because chords have been removed as by-products of sheet extractions from meshes $M_A$ or $M_B$, or because they have been paired with chords created as by-products of sheet insertions into meshes $M_A$ or $M_B$. In a process block 2720 (pseudo code lines 12-15), if a sheet suitable for extraction having an unpaired chord in list $\Omega_A$ is found within mesh $M_A$, then such a sheet is extracted. Extraction of the sheet removes the corresponding chord within interface surface A, thereby eliminating one chord from list $\Omega_A$. In a process block 2725 (pseudo code lines 16-20), list $\Omega_B$ is inspected to determine if a sheet can be inserted in mesh $M_A$, which would add a chord to interface surface A matching a chord in list $\Omega_B$. If such a chord exists in list $\Omega_B$, then the corresponding sheet is inserted into mesh $M_A$, thereby creating a chord pair with the identified chord in list $\Omega_B$. The paired chord is then removed from list $\Omega_B$.

In a process block 2730 (pseudo code lines 22-25), if a sheet suitable for extraction having an unpaired chord in list $\Omega_B$ is found within mesh $M_B$, then such a sheet is extracted, Extraction of the sheet removes the corresponding chord within interface surface B, thereby eliminating one chord from list $\Omega_B$. In a process block 2735 (pseudo code lines 26-30), list $\Omega_A$ is inspected to determine if a sheet can be inserted in mesh $M_B$, which would add a chord to interface surface B matching a chord in list $\Omega_A$. If such a chord exists in list $\Omega_A$, then the corresponding sheet is inserted into mesh $M_B$, thereby creating a chord pair with the identified chord in list $\Omega_A$. The paired chord is then removed from list $\Omega_A$.

When selecting a chord for extraction (pseudo code lines 12 and 22) the sheets in the adjacent hexahedral mesh should be considered. Preferred candidates for extraction include sheets with elements of less than ideal element quality, which typically occur in self-intersecting sheets, self-touching sheets, or sheets with high curvature. Sheets which remain roughly local to the interface surfaces are also suitable for extraction since modifications will remain local when extracted. In addition, chords/sheets which disrupt regular (e.g. grid-like) hexahedral topologies are also good to extract. Extraction of chords/sheets that would result in violation of geometric associativity should be avoided. Likewise, Extraction of chords/sheets that would result in the creation of doublet topology should also be avoided. Any sheet not chosen for extraction can be chosen for insertion.

Of course, process blocks 2720 and 2725 are performed only if mesh $M_A$ is deemed "modifiable." Similarly, process blocks 2730 and 2735 are performed only if mesh $M_B$ is deemed "modifiable." Only a mesh on one side of the interface need be modifiable for mesh matching to work, though superior element quality is generally achieved if both meshes $M_A$ and $M_B$ are modified.

Loop 2715 continues recursively inserting or extracting sheets from meshes $M_A$ and/or $M_B$ until all remaining chords within interface surface A are paired with corresponding chords in interface surface B and all remaining chords within interface surface B are paired with corresponding chords in interface surface A. In other words, loop 2715 continues until lists $\Omega_A$ and $\Omega_B$ are both empty. In some embodiments, it should be appreciated that the insertion and extraction of sheets may not be a simple recursive process. Rather, in some scenarios, it may be desirable to insert several sheets before extracting a single sheet, or any sheet at all. Similarly, in other scenarios, it may be desirable to extract several sheets before inserting a single sheet, or any sheet at all.

Once loop 2715 is complete, interface surfaces A and B are fused together by merging the nodes in the quadrilateral surfaces residing along the interface (process block 2740; pseudo code lines 31-33). In a process block 2745 (pseudo code line 34), meshes $M_A$ and $M_B$ are smoothed to improve element quality. Finally, in a process block 2750, the merged meshes $M_A$ and $M_B$ having a conforming interface are rendered to a display screen.

In one embodiment, locality of the changes is maintained through use of an input depth parameter and column collapse operations. The depth parameter is used during sheet insertions to define pillow shrink sets and sheet inflation quad sets. Propagation when defining these sets terminates after "depth" layers. If the path of an extraction sheet extends too far from the region of the interface, the column collapse operation can be used to redirect the sheets to have a more local path. The depth parameter may be used to select a column to collapse. If an appropriate column to collapse cannot be found, a local sheet can be inserted which intersects the extraction sheet in a column which can then be collapsed. The column collapse operation is a tool that can be used to keep the effects of sheet extractions local to the interface.

Mesh Matching Examples

Mesh Matching Example #1:

FIG. 30A illustrates a two-volume model positioned such that Surface A on Volume A spatially overlaps exactly with Surface B on Volume B. FIG. 30B illustrates the FEM on this model. As seen in FIG. 30C, the FEM is non-conforming at an interface 3005 between the two volumes. In FIG. 31, Volume B is rotated so the quadrilateral meshes on the interface surfaces are visible. The mesh is non-conforming because the quadrilateral mesh on Surface A is different than the quadrilateral mesh on Surface B. In this example, the non-conforming mesh was created because the topology of Volume B requires Surface B to be a linking surface for sweeping, while the topology of Volume A requires Surface A to be a source surface for sweeping.

First, some of the chords in surface A & B are paired. Those chords which do not initially have pairs can be either extracted via sheet extraction or paired with a new chord introduced via sheet insertion. For example, FIG. 32A highlights a chord, $c_i$, in Surface A, which has no pair in Surface B. In FIG. 32B, a string of edges, $E_B$, on Surface B is identified which approximates the projection of $c_i$. $E_R$ partitions the surface quadrilaterals into two sets, of which one is chosen (typically the smaller set). In FIG. 32C, a pillow shrink set is defined as the hexahedral elements behind the chosen quadrilateral set using the input depth parameter to determine how far into the volume to propagate. FIGS. 32D and 32E show the mesh after the pillow is inserted, followed by appropriate smoothing. The resulting new chord 3205 in Surface B is then paired with chord $c_i$ in Surface A. FIGS. 33A-E repeats this process for another unpaired chord in Surface A.

FIGS. 34A-E illustrate the use of dicing during mesh matching. In FIG. 34A, three topologically parallel chords are indicated with dashed lines. One of these three chords is paired with the chord indicated in FIG. 34B, with its corresponding sheet in FIG. 34C. In FIGS. 34D and 34E, this sheet is diced, followed by smoothing, introducing the required topology to match all three chords.

FIGS. 35A-E illustrate the use of sheet extraction during mesh matching. FIG. 35A shows the mesh topology on Surface A with one unpaired chord indicated. FIG. 35B shows the mesh topology of Surface B. The chord indicated in FIG. 35A has no match in Surface B. FIG. 35C shows the mesh in Volume A, with the indicated sheet corresponding to the unpaired chord in FIG. 35A. This indicated sheet is extracted as shown in FIG. 35D which removes the unpaired chord in FIG. 35A from Surface A as shown in FIG. 35E.

Figure 36C:
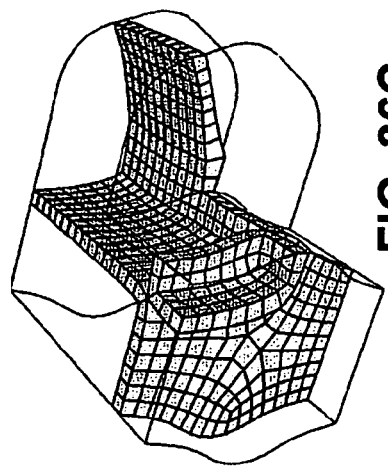
FIGS. 36A-E illustrate a mesh matching example using a column collapse operation to localize changes in a mesh about the interface, in accordance with an embodiment of the invention.
Figure 36B:
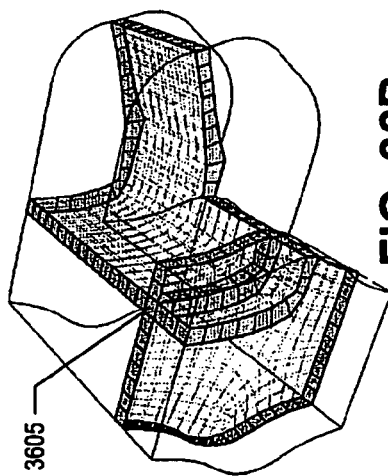
Figure 36A:
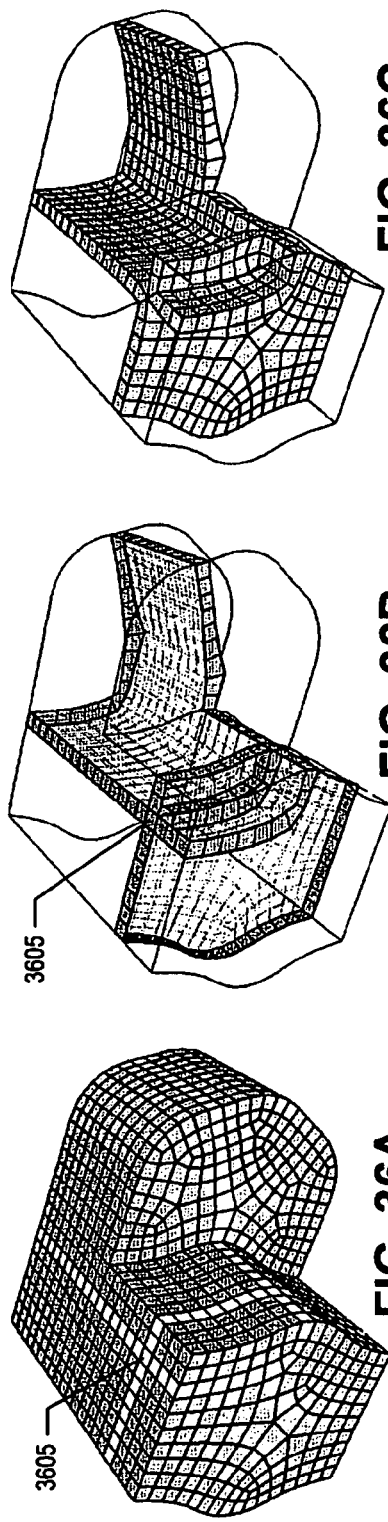
Figure 36E:
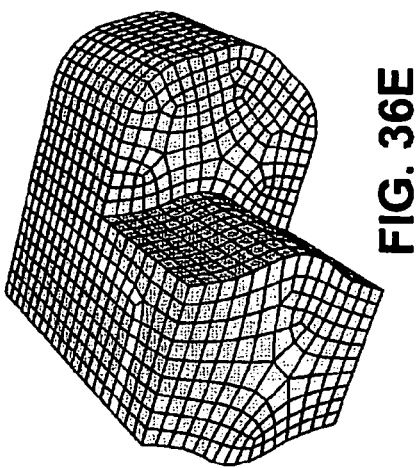
Figure 36D:
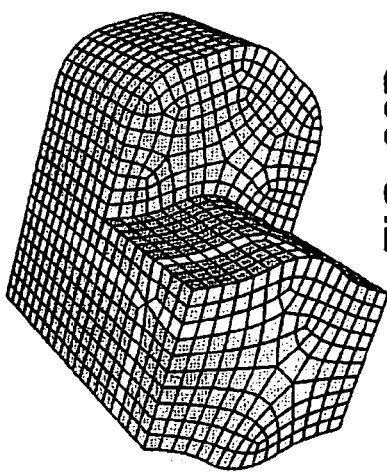

One potentially undesirable side-effect of sheet extraction is that the entire sheet is extracted in order to maintain a conforming all-hexahedral mesh. The extraction sheet in FIG. 35C extends far away from the interface surfaces, resulting in a global change if extracted. However, the changes can be kept local to the region around Surface A, if a column collapse operation is performed prior to extraction. For example, in FIG. 36A one additional sheet, which remains local to the interface surfaces, is identified. If such a local sheet does not exist in the mesh, one can be inserted by pillowing a few layers of hexahedra away from the interface surfaces. The two sheets indicated in FIG. 36A intersect in a column 3605 of hexahedra as shown in FIG. 36B. By collapsing column 3605, the sheet to extract is redirected in such a way that it now remains local to the interface surfaces as illustrated in FIGS. 36C and 36D. The chord can then be extracted as illustrated in FIG. 36E keeping all changes local to the interface surfaces.

Figure 37B:
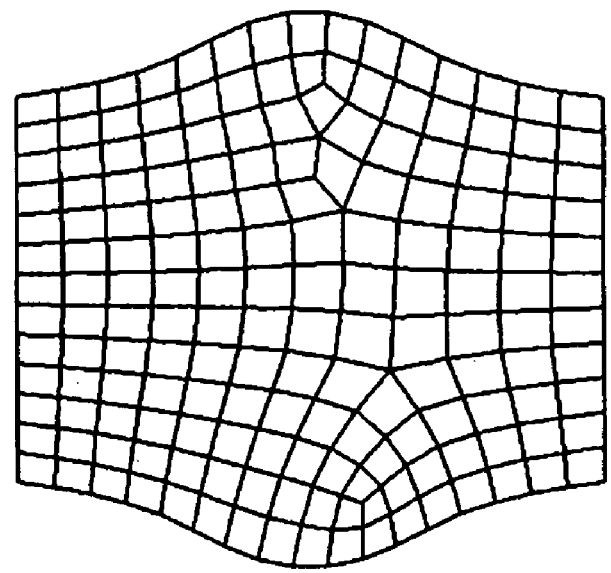
FIGS. 37A, B illustrate a mesh having a conforming interface having mesh matching, in accordance with an embodiment of the invention.
Figure 37A:
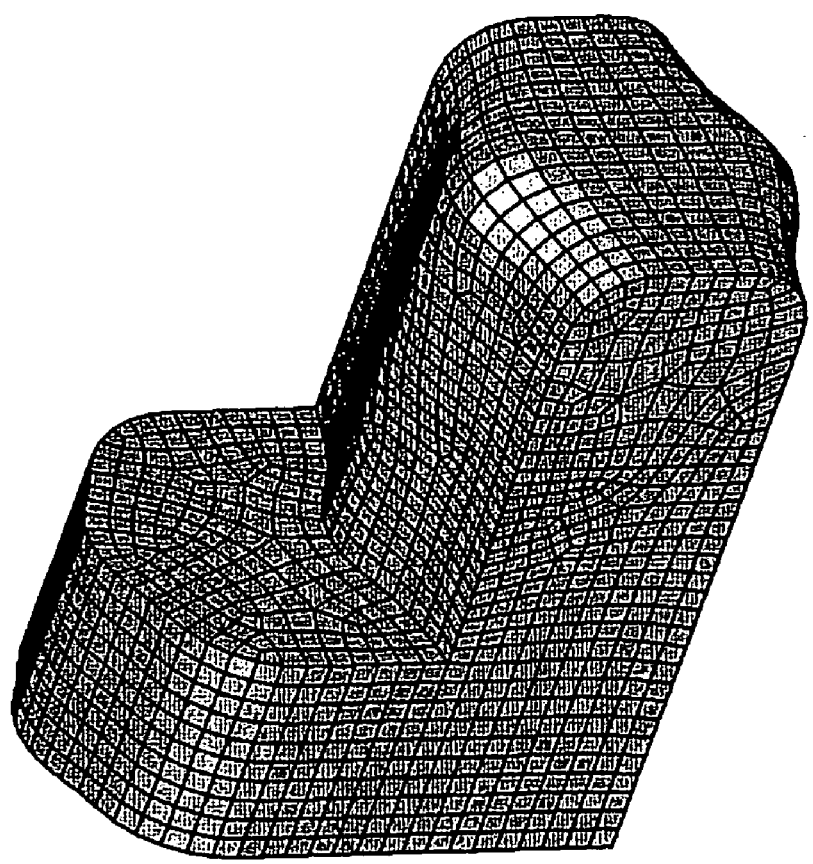

With each of these operations, the topologies on the two interface surfaces begin to look more alike. Sheet insertion and extraction can be applied repeatedly until the topology of the quadrilaterals on the interface surfaces matches. FIG. 37A shows what the final mesh on the model may be, with the final interface quadrilateral mesh shown in FIG. 37B. Both surface A and B have this mesh topology allowing the nodes to be merged, creating a conforming mesh. Note that the results from mesh matching are not unique for a given model. The topology of the final conforming mesh is dependent upon the order that the non-paired chords are processed, and how they are processed.

Figure 38A:
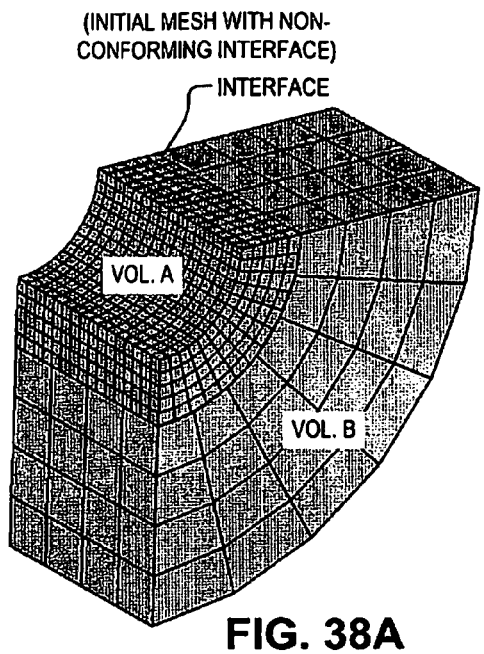
FIGS. 38A-D illustrate how mesh matching can be applied to one or both sides of a non-conforming interface, in accordance with an embodiment of the invention.
Figure 38B:
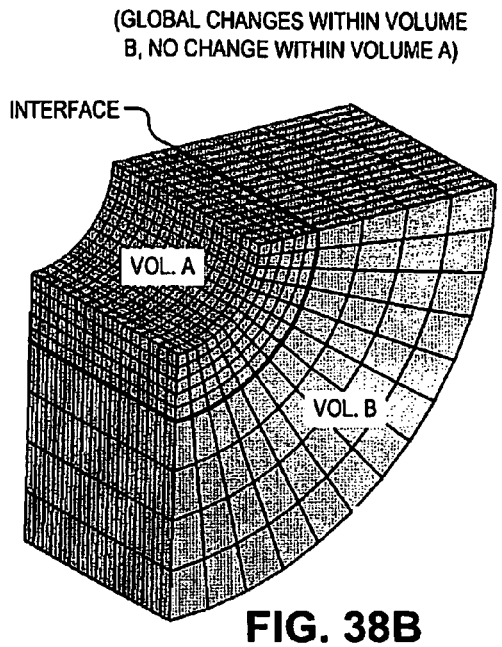
Figure 38C:
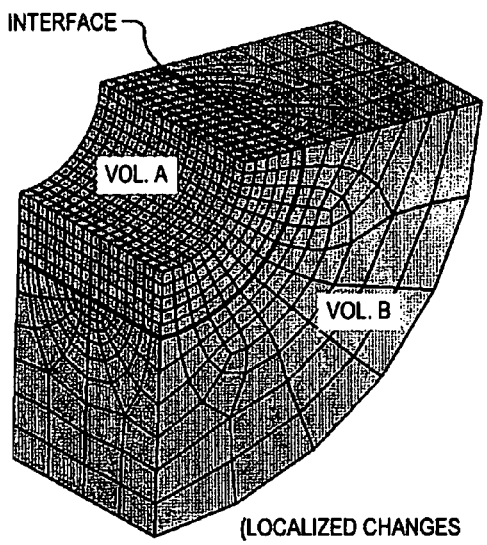
Figure 38D:
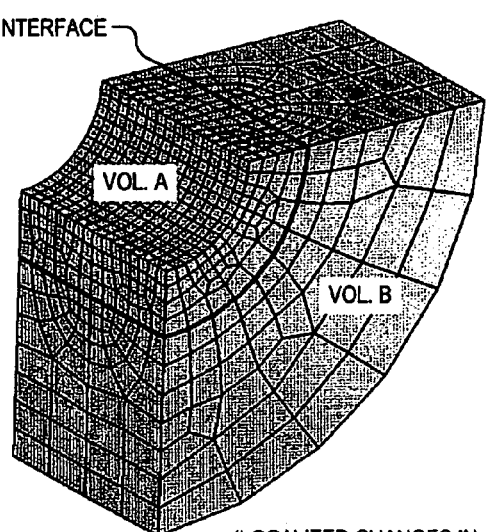

Mesh Matching Example #2:

In this example, the ability of mesh matching to modify only one side of the interface is demonstrated. Furthermore, the difference between local and non-local matching is made apparent. FIG. 38A shows a non-conforming mesh interface and FIGS. 38B-D illustrate three possible mesh matching results. In FIGS. 38B and 38C, changes are made to only Volume B. This type of matching is useful when one side of the interface must not be changed, perhaps because it has a boundary layer mesh, or the expected physical response requires a specific mesh. FIG. 38B modifies the mesh globally propagating changes to the mesh topology at the interface throughout Volume B. These global modifications typically introduce non-isotropic element shapes, but maintain high element quality by avoiding the introduction of irregular nodes. Global changes during mesh matching work well for small models with only a few volumes. However, in the context of large assemblies, these global modifications turn simple interface changes into far-reaching modifications. In FIG. 38C mesh topology changes are kept local to the interface in Volume B, at the expense of lower element quality and an unstructured mesh topology.

In FIG. 38D, mesh matching modifies the mesh topology on both sides of the interface (Volumes A and B). This allows a smoother transition in element size, and allows mesh matching to minimize element count increases.

Demonstrative Processing System

Figure 39:
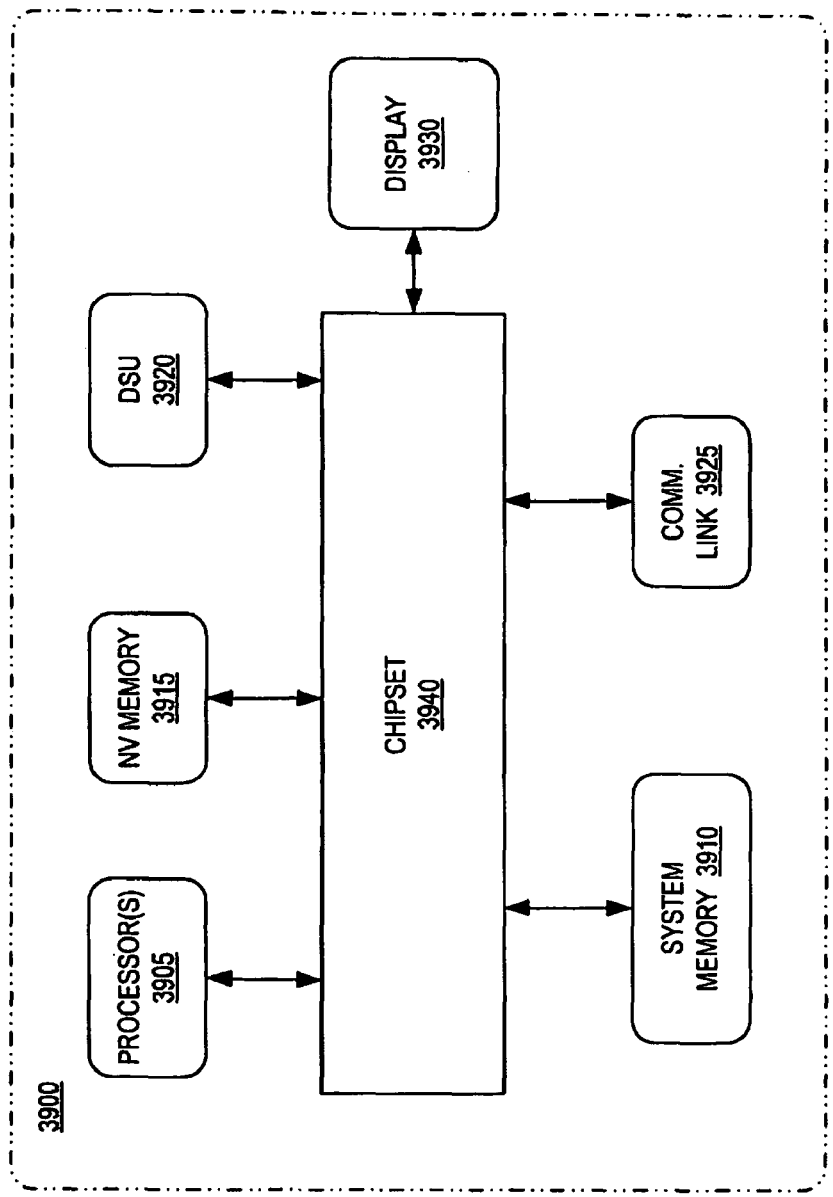
FIG. 39 is a functional block diagram illustrating a demonstrative processing system to store and execute embodiments of the invention thereon.

FIG. 39 is a block diagram illustrating a demonstrative processing system 3900 for executing embodiments of the invention described above. The illustrated embodiment of processing system 3900 includes one or more processors (or central processing units) 3905, system memory 3910, non-volatile ("NV") memory 3915, a data storage unit ("DSU") 3920, a communication link 3925, a display 3930, and a chipset 3940. The illustrated processing system 3900 may represent any computing system including a desktop computer, a notebook computer, a workstation, a handheld computer, a server, a blade, or the like.

The elements of processing system 3900 are interconnected as follows. Processor(s) 3905 is communicatively coupled to system memory 3910, NV memory 3915, DSU 3920, and communication link 3925, via chipset 3940 to send and to receive instructions or data thereto/therefrom. In one embodiment, NV memory 3915 is a flash memory device. In other embodiments, NV memory 3915 includes any one of read only memory ("ROM"), programmable ROM, erasable programmable ROM, electrically erasable programmable ROM, or the like. In one embodiment, system memory 3910 includes random access memory ("RAM"), such as dynamic RAM ("DRAM"), synchronous DRAM ("SDRAM"), double data rate SDRAM ("DDR SDRAM"), static RAM ("SRAM"), or the like. DSU 3920 represents any storage device for software data, applications, and/or operating systems, but will most typically be a nonvolatile storage device. DSU 3920 may optionally include one or more of an integrated drive electronic ("IDE") hard disk, an enhanced IDE ("EIDE") hard disk, a redundant array of independent disks ("RAID"), a small computer system interface ("SCSI") hard disk, floppy disks, magnetic tapes, various other types of hard disks, and the like. Although DSU 3920 is illustrated as internal to processing system 3900, DSU 3920 may be externally coupled to processing system 3900. Communication link 3925 may couple processing system 3900 to a network such that processing system 3900 may communicate over the network with one or more other computers. Communication link 3925 may include a modem, an Ethernet card, a Gigabit Ethernet card, Universal Serial Bus ("USB") port, a wireless network interface card, a fiber optic interface, or the like. Display unit 3930 may be coupled to chipset 3940 via a graphics card and renders images for viewing by a user.

It should be appreciated that various other elements of processing system 3900 may have been excluded from FIG. 39 and this discussion for the purposes of clarity. Chipset 3940 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 3940. Correspondingly, processing system 3900 may operate without one or more of the elements illustrated. For example, processing system 3900 need not include DSU 3920.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method of conforming an interface between a first mesh and a second mesh, the method comprising:

identifying a first interface surface in the first mesh and a second interface surface in the second mesh residing along the interface, wherein the first and second interface surfaces are initially non-conforming along the interface;

pairing chords within the first and second interface surfaces that fall within a threshold separation distance of each other;

identifying unpaired chords within the first and second interface surfaces after pairing the chords that are within the threshold separation distance of each other; recursively inserting or extracting one or more sheets within one or both of the first or second meshes, wherein the sheets that are extracted each include one of the unpaired chords that reside within the first or second interface surfaces and the sheets that are inserted each include a chord that matches one of the unpaired chords, wherein the recursive inserting or extracting continues until all chords within the first interface surface are paired with corresponding chords in the second interface surface and all chords within the second interface surface are paired with corresponding chords in the first interface surface;

setting a depth parameter in the first mesh indicating how many layers of elements within the first mesh changes are permitted; and performing column collapse operations within the first mesh to localize changes within the first mesh to within the depth parameter about the interface.

2. The computer implemented method of claim 1, wherein the first mesh is a first volume of a non-conforming mesh and the second mesh is a second volume of the non-conforming mesh.

3. The computer implemented method of claim 1, further comprising merging interface nodes along the interface within the first and second interface surfaces to fuse the first and second interface surfaces into a single interface surface.

4. The computer implemented method of claim 3, wherein the first mesh models a first subcomponent of a mesh assembly and the second mesh models a second subcomponent of the mesh assembly.

5. The computer implemented method of claim 4, wherein the first and second meshes comprise hexahedral meshes.

6. The computer implemented method of claim 1, wherein recursively inserting or extracting sheets within one or both of the first and second meshes comprises only inserting or extracting sheets from the first mesh while leaving the second mesh unmodified until the interface is conforming.

7. The computer implemented method of claim 1, wherein recursively inserting or extracting sheets within one or both of the first and second meshes comprises reciprocally inserting or extracting sheets from both the first and second meshes until the interface is conforming.

8. The computer implemented method of claim 1, wherein the threshold separation distance is less than an element size.

9. The computer implemented method of claim 1, wherein inserting the one or more sheets comprises inserting at least one self-touching or self-intersecting sheet into the first mesh.

10. The computer implemented method of claim 9, wherein inserting the one or more sheets further comprises inserting a self-touching or self-intersecting sheet including two edge sets, each of the edge sets including edges that are each adjacent to three quadrilateral faces within the self-touching or self-intersecting sheet, wherein quadrilaterals residing between the two edge sets are duplicated twice during insertion of the self-touching or self-intersecting sheet.

11. The computer implemented method of claim 9, wherein inserting the one or more sheets further comprises inserting a self-touching or self-intersecting sheet including an edge set which includes edges that are each adjacent to at least four quadrilateral faces within the self-touching or self-intersecting sheet, wherein nodes along the edge set are duplicated twice during insertion of the self-touching or self-intersecting sheet.

12. The computer implemented method of claim 1 wherein the interface is conforming when all nodes and all faces in the first and second interface surfaces along the interface are aligned and paired with a counterpart node or counterpart face, respectively, in an opposite one of the first or second interface surfaces.

13. A non-transitory tangible computer-accessible storage medium that provides instructions that, if executed by a computer, will cause the computer to perform operations comprising:

identifying a first interface surface in a first hexahedral mesh and a second interface surface in a second hexahedral mesh residing along an interface between the first and second hexahedral meshes, wherein the first and second interface surfaces are initially non-conforming along the interface;

pairing chords within the first and second interface surfaces that fall within a threshold separation distance of each other;

identifying unpaired chords within the first and second interface surfaces after pairing the chords that are within the threshold separation distance of each other; recursively inserting or extracting one or more sheets within one or both of the first or second hexahedral meshes, wherein the sheets that are extracted each include one of the unpaired chords that reside within the first or second interface surfaces and the sheets that are inserted each include a chord that matches one of the unpaired chords, wherein the recursive inserting or extracting continues until all chords within the first interface surface are paired with corresponding chords in the second interface surface and all chords within the second interface surface are paired with corresponding chords in the first interface surface; and setting a depth parameter in the first hexahedral mesh indicating how many layers of elements within the first hexahedral mesh changes are permitted; and performing column collapse operations within the first hexahedral mesh to localize changes within the first hexahedral mesh to within the depth parameter about the interface.

14. The non-transitory tangible computer-accessible storage medium of claim 13, wherein the first hexahedral mesh is a first portion of a non-conforming mesh and the second hexahedral mesh is a second portion of the non-conforming mesh.

15. The non-transitory tangible computer-accessible storage medium of claim 13, further comprising merging interface nodes along the interface within the first and second interface surfaces to fuse the first and second interface surfaces into a single interface surface thereby fusing the first and second hexahedral meshes into a single conforming hexahedral mesh.

16. The non-transitory tangible computer-accessible storage medium of claim 15, wherein the first hexahedral mesh models a first subcomponent of a finite element mesh ("FEM") assembly and the second hexahedral mesh models a second subcomponent of the FEM assembly.

17. The non-transitory tangible computer-accessible storage medium of claim 13, wherein recursively inserting or extracting sheets within one or both of the first and second hexahedral meshes comprises only inserting or extracting sheets from the first hexahedral mesh while leaving the second hexahedral mesh unmodified until the interface is conforming.

18. The non-transitory tangible computer-accessible storage medium of claim 13, wherein recursively inserting or extracting sheets within one or both of the first and second hexahedral meshes comprises inserting or extracting sheets from both the first and second hexahedral meshes until the interface is conforming.

19. The non-transitory tangible computer-accessible storage medium of claim 13, wherein the threshold separation distance is less than an element size.

20. The non-transitory tangible computer-accessible storage medium of claim 13, wherein inserting the one or more sheets comprises inserting at least one self-touching or self-intersecting sheet into the first hexahedral mesh.

21. The non-transitory tangible computer-accessible storage medium of claim 20, wherein inserting the one or more sheets further comprises inserting a self-touching or self-intersecting sheet including two edge sets, each of the edge sets including edges that are each adjacent to three quadrilateral faces within the self-touching or self-intersecting sheet, wherein quadrilaterals residing between the two edge sets are duplicated twice during insertion of the self-touching or self-intersecting sheet.

22. The non-transitory tangible computer-accessible storage medium of claim 20, wherein inserting the one or more sheets further comprises inserting a self-touching or self-intersecting sheet including a pair of edge sets including a first edge set having edges that are each adjacent to three quadrilateral faces within the self-touching or self-intersecting sheet and a second edge set residing along a boundary of the first hexahedral mesh, wherein quadrilaterals residing between the first and second edge sets are duplicated twice during insertion of the self-touching or self-intersecting sheet.

23. The non-transitory tangible computer-accessible storage medium of claim 20, wherein inserting the one or more sheets further comprises inserting a self-touching or self-intersecting sheet including an edge set which includes edges that are each adjacent to at least four quadrilateral faces within the self-touching or self-intersecting sheet, wherein nodes along the edge set are duplicated twice during insertion of the self-touching or self-intersecting sheet.

24. The non-transitory tangible computer-accessible storage medium of claim 13 wherein the interface is conforming when all nodes and all faces in the first and second interface surfaces along the interface are aligned and paired with a counterpart node or counterpart face, respectively, in an opposite one of the first or second interface surfaces.

25. A non-transitory tangible computer-accessible storage medium that provides instructions that, if executed by a computer, will cause the computer to perform operations comprising:
  identifying a first interface surface in a first hexahedral mesh and a second interface surface in a second hexahedral mesh residing along an interface between the first and second hexahedral meshes, wherein the first and second interface surfaces are initially non-conforming along the interface;
  pairing chords within the first and second interface surfaces that fall within a threshold separation distance of each other;
  recursively inserting or extracting one or more sheets within one or both of the first or second hexahedral meshes having chords that reside within the first or second interface surfaces until all chords within the first interface surface are paired with corresponding chords in the second interface surface and all chords within the second interface surface are paired with corresponding chords in the first interface surface;
  setting a depth parameter in the first hexahedral mesh indicating how many layers of elements within the first hexahedral mesh changes are permitted; and
  performing column collapse operations within the first hexahedral mesh to localize changes within the first hexahedral mesh to within the depth parameter about the interface.

* * * * *